(12) United States Patent
Li et al.

(10) Patent No.: US 11,418,814 B2
(45) Date of Patent: Aug. 16, 2022

(54) CONSTRAINT ON SYNTAX ELEMENTS FOR STILL PICTURE PROFILES

(71) Applicant: TENCENT AMERICA LLC, Palo Alto, CA (US)

(72) Inventors: Ling Li, Seoul (KR); Xiang Li, Saratoga, CA (US); Shan Liu, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/231,416

(22) Filed: Apr. 15, 2021

(65) Prior Publication Data

US 2021/0368207 A1    Nov. 25, 2021

Related U.S. Application Data

(60) Provisional application No. 63/029,359, filed on May 22, 2020.

(51) Int. Cl.
*H04N 19/70* (2014.01)
*H04N 19/103* (2014.01)
*H04N 19/172* (2014.01)

(52) U.S. Cl.
CPC ........... *H04N 19/70* (2014.11); *H04N 19/103* (2014.11); *H04N 19/172* (2014.11)

(58) Field of Classification Search
CPC ............................. H04N 19/70; H04N 19/103
See application file for complete search history.

(56) References Cited

U.S. PATENT DOCUMENTS

| 5,987,179 A | * | 11/1999 | Riek | H04N 19/162 |
| | | | | 375/E7.211 |
| 2020/0107027 A1 | * | 4/2020 | He | H04N 19/105 |

OTHER PUBLICATIONS

International Search Report dated Aug. 6, 2021 in International Application No. PCT/US21/29362.
Written Opinion of the International Searching Authority dated Aug. 6, 2021 in International Application No. PCT/US21/29362.

* cited by examiner

*Primary Examiner* — Jerry T Jean Baptiste
(74) *Attorney, Agent, or Firm* — Sughrue Mion, PLLC

(57) ABSTRACT

Systems and methods for decoding are provided. A method includes receiving a bitstream including a sequence parameter set (SPS), the SPS including a flag that specifies whether the bitstream includes only one coded picture; inferring a value of at least one syntax element of the SPS, based on the flag specifying that the bitstream includes only the one coded picture; and decoding the one coded picture based on the inferring.

20 Claims, 6 Drawing Sheets

CONSTRAINT ON SYNTAX ELEMENTS FOR STILL PICTURE PROFILES

CROSS-REFERENCE TO THE RELATED APPLICATION

This application claims priority from U.S. Provisional Application No. 63/029,359, filed on May 22, 2020, the disclosure of which is incorporated herein by reference in its entirety.

FIELD

Embodiments of the present disclosure are directed to advance video coding techniques and, more specifically, techniques for the next-generation video coding technologies beyond HEVC (High Efficiency Video Coding), e.g., Versatile Video Coding (VVC).

BACKGROUND

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, these two standard organizations jointly formed the Joint Video Exploration Team (JVET) to explore the potential of developing the next video coding standard beyond HEVC. In October 2017, JVET issued the Joint Call for Proposals on Video Compression with Capability beyond HEVC (CfP). By Feb. 15, 2018, a total of 22 CfP responses on standard dynamic range (SDR), 12 CfP responses on high dynamic range (HDR), and 12 CfP responses on 360 video categories were submitted. In April 2018, all received CfP responses were evaluated in the 122nd Moving Picture Experts Group (MPEG)/10th JVET meeting. As a result of this meeting, JVET formally launched the standardization process of next-generation video coding beyond HEVC. The new standard was named Versatile Video Coding (VVC), and JVET was renamed as Joint Video Expert Team. The current version of the VVC Test Model (VTM) is VTM 7.

SUMMARY

Embodiments of the present disclosure provide constraints on syntax elements and additional syntax tables on top of existing disclosures.

According to one or more embodiments, a method performed by at least one processor is provided. The method includes: receiving a bitstream including a sequence parameter set (SPS), the SPS including a flag that specifies whether the bitstream includes only one coded picture; inferring a value of at least one syntax element of the SPS, based on the flag specifying that the bitstream includes only the one coded picture; and decoding the one coded picture based on the inferring.

According to an embodiment, the at least one syntax element of the SPS includes a syntax element that specifies an ID of a video parameter set.

According to an embodiment, the at least one syntax element of the SPS includes a syntax element that specifies a maximum number of temporal sublayers that are allowed to be present in each coded layer video sequence (CLVS) referring to the SPS.

According to an embodiment, the at least one syntax element of the SPS includes a flag that specifies whether a profile, tier, level syntax structure is present in the SPS.

According to an embodiment, the at least one syntax element of the SPS includes a syntax element related to picture order count (POC).

According to an embodiment, the at least one syntax element of the SPS includes a syntax element related to inter slice.

According to an embodiment, the at least one syntax element of the SPS includes a syntax element related to an inter coding tool.

According to an embodiment, the method further includes inferring a value of at least one syntax element of a picture header of the one coded picture, based on the flag specifying that the bitstream includes only the one coded picture, wherein the decoding comprises decoding the one coded picture based on the inferring of the value of the at least one syntax element of the SPS and the value of the at least one syntax element of the SPS.

According to an embodiment, the at least one syntax element of the picture header includes a flag that specifies whether a slice type is allowed for the one coded picture.

According to an embodiment, the at least one syntax element of the picture header includes a flag that specifies whether the one coded picture is a reference picture.

According to an embodiment, the at least one syntax element of the picture header includes a syntax element related to a picture order count (POC) or a decoded picture buffer (DPB).

According to one or more embodiments, a system is provided. The system includes: at least one memory storing computer code; and at least one processor configured to receive a bitstream including a sequence parameter set (SPS), the SPS including a flag that specifies whether the bitstream includes only one coded picture. The at least one processor is further configured to access the computer code and operate as instructed by the computer code. The computer code includes: inferring code configured to cause the at least one processor to infer a value of at least one syntax element of the SPS, based on the flag specifying that the bitstream includes only the one coded picture; and decoding code configured to cause the at least one processor to decode the one coded picture based on inferring the value of the at least one syntax element of the SPS.

According to an embodiment, the at least one syntax element of the SPS includes a syntax element that specifies an ID of a video parameter set.

According to an embodiment, the at least one syntax element of the SPS includes a syntax element that specifies a maximum number of temporal sublayers that are allowed to be present in each coded layer video sequence (CLVS) referring to the SPS.

According to an embodiment, the at least one syntax element of the SPS includes a flag that specifies whether a profile, tier, level syntax structure is present in the SPS.

According to an embodiment, the at least one syntax element of the SPS includes a syntax element related to picture order count (POC).

According to an embodiment, the at least one syntax element of the SPS includes a syntax element related to inter slice.

According to an embodiment, the at least one syntax element of the SPS includes a syntax element related to an inter coding tool.

According to an embodiment, the inferring code is further configured the cause the at least one processor to infer a value of at least one syntax element of a picture header of the one coded picture, based on the flag specifying that the bitstream includes only the one coded picture, and the decoding code is configured the cause the at least one processor to decode the one coded picture based on inferring the value of the at least one syntax element of the SPS and the value of the at least one syntax element of the SPS.

According to one or more embodiments, a non-transitory computer-readable medium storing computer code is provided. The computer code is configured to, when executed by at least one processor, cause the at least one processor to: infer a value of at least one syntax element of an SPS of a received bitstream, based on a flag of the SPS specifying that the received bitstream includes only one coded picture; and decode the one coded picture based on inferring the value of the at least one syntax element of the SPS.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
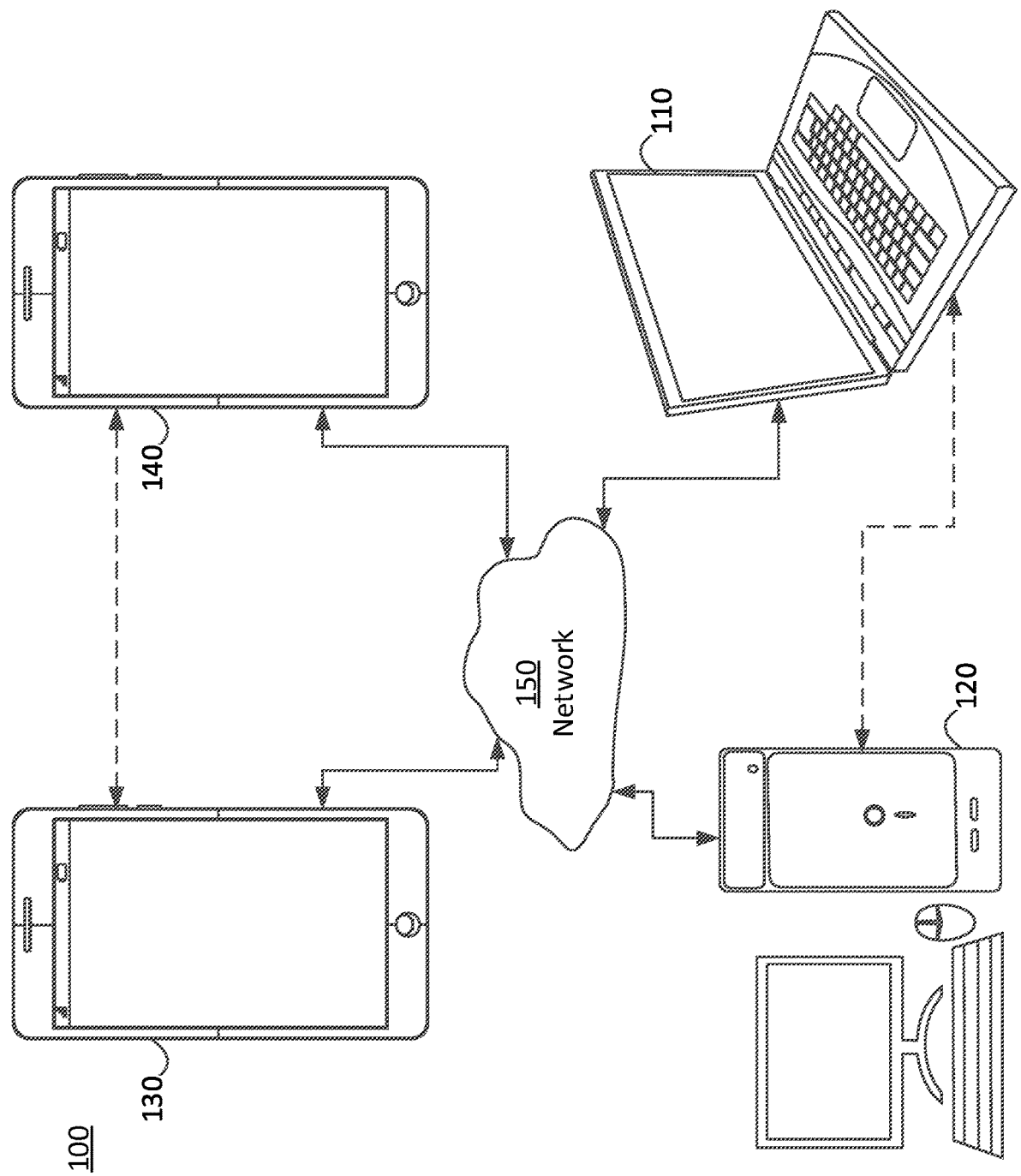
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
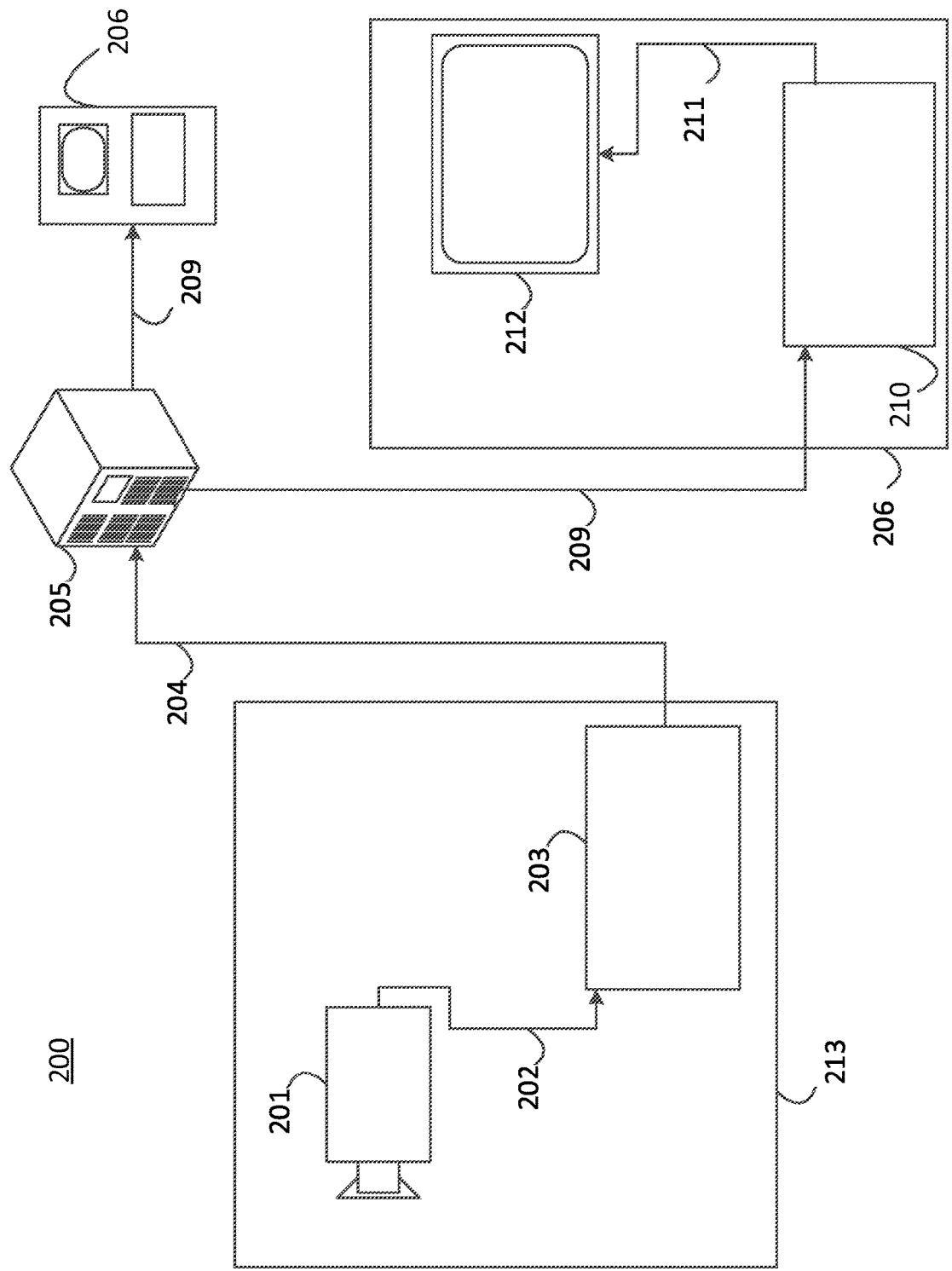
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
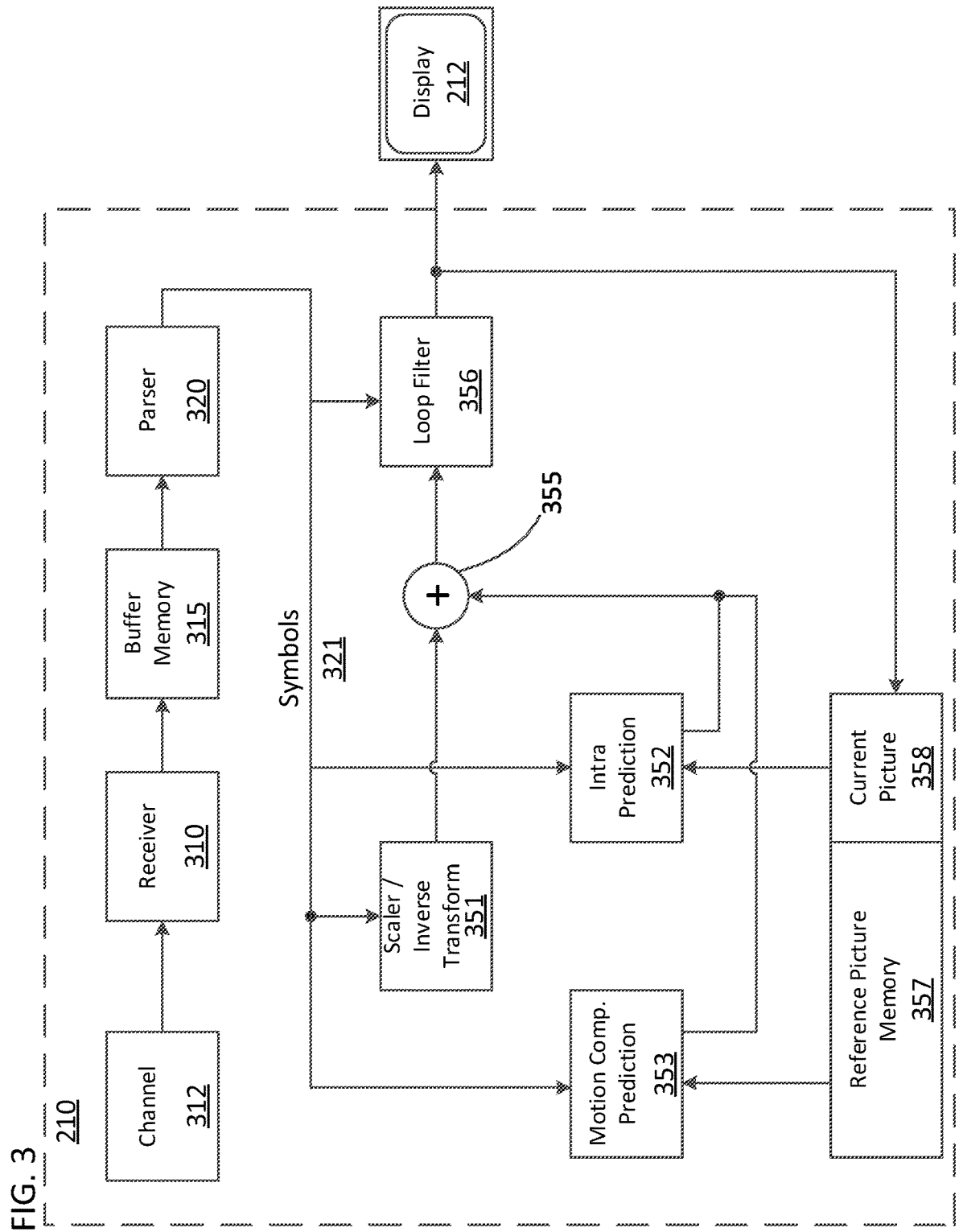
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
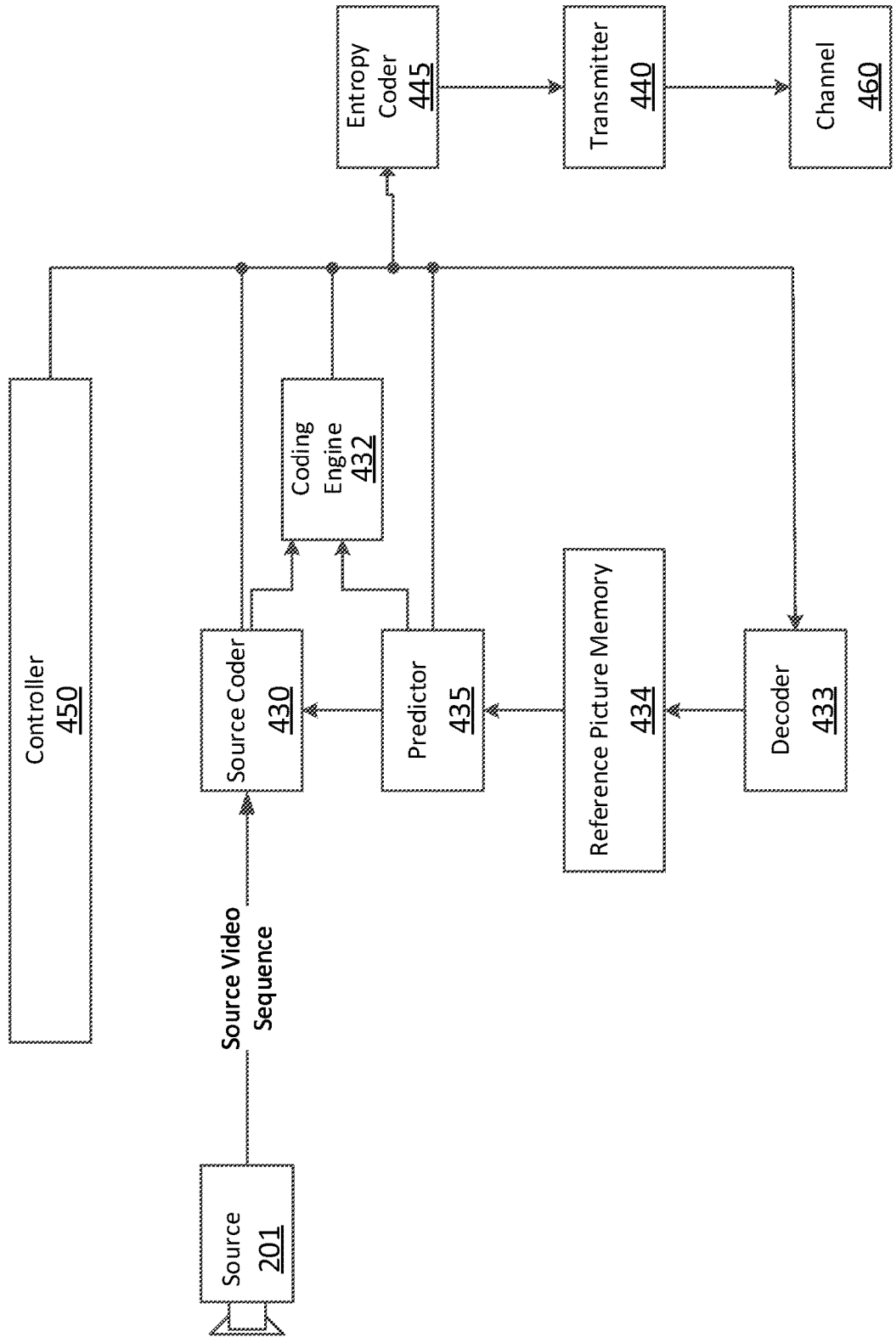
FIG. 4 is a schematic illustration of a simplified block diagram of an encoder in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block.

Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Embodiments of the present disclosure may implement aspects as described below.

1. Sequence Parameter Set

In VVC Draft 8, syntax elements in sequence parameter set (SPS) may be provided as shown in TABLE 1 (see end of Detailed Description). Such syntax elements may relate to intra coding and inter coding. Compared to HEVC, a larger amount of syntax elements is present in SPS. It is noted that for any intra profiles which only consists of intra slices, inter coding syntax elements may not be used for decoding process. The situation may be the same with any still picture profiles.

Profile, Tier and Level]

In VVC Draft 9, profile, tier and level syntax elements may be present in SPS as shown below in TABLE 2, and general constraint information may be present in profile_tier_level ( ) as shown in TABLE 3 (see end of Detailed Description).

TABLE 2

Profile, Tier and Level Syntax

| | Descriptor |
|---|---|
| profile_tier_level( profileTierPresentFlag,<br>  maxNumSubLayersMinus1 ) {<br>    if( profileTierPresentFlag ) { | |

TABLE 2-continued

| Profile, Tier and Level Syntax | |
|---|---|
| | Descriptor |
| general_profile_idc | u(7) |
| general_tier_flag | u(1) |
| general_constraint_info( ) | |
| } | |
| general_level_idc | u(8) |
| ... | |
| } | |

Syntax element general_one_picture_only_constraint_flag equal to 1 may specify that there is only one coded picture in the bitstream. Syntax element general_one_picture_only_constraint_flag equal to 0 may not impose such a constraint.

Syntax element intra_only_constraint_flag equal to 1 may specify that sh_slice_type shall be equal to I. The syntax element intra_only_constraint_flag equal to 0 may not impose such a constraint. When general_one_picture_only_constraint_flag is equal to 1, the value of intra_only_constraint_flag may be required to be equal to 1.

3. Picture Header

In VVC Draft 8, syntax elements may be provided in picture header (PH) as shown in TABLE 3, provided below, and TABLE 4 (see end of Detailed Description). A picture can have combination of intra and inter slices. When a picture has only intra slices, inter coding syntax elements may not be used in the decoding process. To reduce overhead in a picture, ph_inter_slice_allowed_flag and ph_intra_slice_allowed_flag may be used to conditionally signal intra coding related syntax elements and inter coding related syntax elements.

TABLE 3

| Picture header RBSP syntax | |
|---|---|
| | Descriptor |
| picture_header_rbsp( ) { | |
|    picture_header_structure( ) | |
|    rbsp_trailing_bits( ) | |
| } | |

Syntax element ph_gdr_or_irap_pic_flag equal to 1 may specify that the current picture is a GDR or IRAP picture. Syntax element ph_gdr_or_irap_pic_flag equal to 0 may specify that the current picture is not a GDR picture and may or may not be an IRAP picture.

Syntax element ph_gdr_pic_flag equal to 1 may specify the picture associated with the PH is a GDR picture. Syntax element ph_gdr_pic_flag equal to 0 may specify that the picture associated with the PH is not a GDR picture. When not present, the value of ph_gdr_pic_flag may be inferred to be equal to 0. When sps_gdr_enabled_flag is equal to 0, the value of ph_gdr_pic_flag may be required to be equal to 0. According to an embodiment, when ph_gdr_or_irap_pic_flag is equal to 1 and ph_gdr_pic_flag is equal to 0, the picture associated with the PH is an IRAP picture.

Syntax element ph_inter_slice_allowed_flag equal to 0 may specify that all coded slices of the picture have sh_slice_type equal to 2. Syntax element ph_inter_slice_allowed_flag equal to 1 may specify that there may or may not be one or more coded slices in the picture that have sh_slice_type equal to 0 or 1.

When ph_gdr_or_irap_pic_flag is equal to 1 and ph_gdr_pic_flag is equal to 0 (i.e., the picture is an IRAP picture), and vps_independent_layer_flag[GeneralLayerIdx[nuh_layer_id] ] is equal to 1, the value of ph_inter_slice_allowed_flag may be required to be equal to 0.

Syntax element ph_intra_slice_allowed_flag equal to 0 may specify that all coded slices of the picture have sh_slice_type equal to 0 or 1. Syntax element ph_intra_slice_allowed_flag equal to 1 may specify that there may or may not be one or more coded slices in the picture that have sh_slice_type equal to 2. When not present, the value of ph_intra_slice_allowed_flag may be inferred to be equal to 1. According to an embodiment, for bitstreams that are supposed to work subpicture-based bitstream merging without the need of changing PH network abstraction layer (NAL) units, the encoder may be expected to set the values of both ph_inter_slice_allowed_flag and ph_intra_slice_allowed_flag equal to 1.

Syntax element ph_non_ref_pic_flag equal to 1 may specify the picture associated with the PH is never used as a reference picture. Syntax element ph_non_ref_pic_flag equal to 0 may specify the picture associated with the PH may or may not be used as a reference picture.

Syntax element ph_pic_parameter_set_id may specify the value of pps_pic_parameter_set_id for the PPS in use. The value of ph_pic_parameter_set_id may be required to be in the range of 0 to 63, inclusive.

It may be a requirement of bitstream conformance that the value of TemporalId of the PH be greater than or equal to the value of TemporalId of the PPS that has pps_pic_parameter_set_id equal to ph_pic_parameter_set_id.

Syntax element ph_pic_order_cnt_lsb may specify the picture order count modulo MaxPicOrderCntLsb for the current picture. The length of the ph_pic_order_cnt_lsb syntax element may be sps_log2_max_pic_order_cnt_lsb_minus4+4 bits. The value of the ph_pic_order_cnt_lsb may be required to be in the range of 0 to MaxPicOrderCntLsb−1, inclusive.

Syntax element ph_no_output_of_prior_pics_flag affects the output of previously-decoded pictures in the DPB after the decoding of a picture in a CVSS access unit (AU) that is not the first AU in the bitstream.

It may be a requirement of bitstream conformance that, when present, the value of ph_no_output_of_prior_pics_flag be the same for all pictures in an AU.

When ph_no_output_of_prior_pics_flag is present in the PHs of the pictures in an AU, the ph_no_output_of_prior_pics_flag value of the AU may be the ph_no_output_of_prior_pics_flag value of the pictures in the AU.

Syntax element ph_recovery_poc_cnt may specify the recovery point of decoded pictures in output order.

When the current picture is a GDR picture, the variable recoveryPointPocVal may be derived as follows:

recoveryPointPocVal=PicOrderCntVal+ph_recovery_poc_cnt

If the current picture is a GDR picture, and there is a picture picA that follows the current GDR picture in decoding order in the coded layer video sequence (CLVS) that has PicOrderCntVal equal to recoveryPointPocVal, the picture picA may be referred to as the recovery point picture. Otherwise, the first picture in output order that has PicOrderCntVal greater than recoveryPointPocVal in the CLVS may be referred to as the recovery point picture. The recovery point picture may be required to not precede the current GDR picture in decoding order. The pictures that are associated with the current GDR picture and have PicOrderCntVal less than recoveryPointPocVal may be referred to as the recovering pictures of the GDR picture. The value of ph_recovery_poc_cnt may be required to be in the range of 0 to MaxPicOrderCntLsb−1, inclusive. According to an embodiment, when sps_gdr_enabled_flag is equal to 1 and PicOrderCntVal of the current picture is greater than or equal to recoveryPointPocVal of the associated GDR picture, the current and subsequent decoded pictures in output order are exact match to the corresponding pictures produced by starting the decoding process from the previous IRAP picture, when present, preceding the associated GDR picture in decoding order.

Syntax element ph_extra_bit[i] may be equal to 1 or 0. Decoders may be required to ignore the value of ph_extra_bit[i]. Its value may not affect decoder conformance to specified profiles.

Syntax element ph_poc_msb_cycle_present_flag equal to 1 may specify that the syntax element ph_poc_msb_cycle_val is present in the PH. ph_poc_msb_cycle_present_flag equal to 0 may specify that the syntax element ph_poc_msb_cycle_val is not present in the PH. When vps_independent_layer_flag[GeneralLayerIdx[nuh_layer_id] ] is equal to 0 and there is a picture in the current AU in a reference layer of the current layer, the value of ph_poc_msb_cycle_present_flag may be required to be equal to 0.

Syntax element ph_poc_msb_cycle_val may specify the value of the POC MSB cycle of the current picture. The length of the syntax element ph_poc_msb_cycle_val may be sps_poc_msb_cycle_len_minus1+1 bits.

Syntax element ph_alf_enabled_flag equal to 1 may specify that adaptive loop filter is enabled and may be used for the current picture. The syntax element ph_alf_enabled_flag equal to 0 may specify that adaptive loop filter is disabled and not used for the current picture. When not present, ph_alf_enabled_flag may be inferred to be equal to 0.

Syntax element ph_num_alf_aps_ids_luma may specify the number of ALF APSs that the slices associated with the PH refers to.

Syntax element ph_alf_aps_id_luma[i] specifies the aps_adaptation_parameter_set_id of the i-th adaptive loop filter (ALF) adaptation parameter set (APS) that the luma component of the slices associated with the PH refers to.

When ph_alf_aps_id_luma[i] is present, the following may apply:
(a) The value of alf_luma_filter_signal_flag of the APS NAL unit having aps_params_type equal to ALF_APS and aps_adaptation_parameter_set_id equal to ph_alf_aps_id_luma[i] shall be equal to 1.
(b) The TemporalId of the APS NAL unit having aps_params_type equal to ALF_APS and aps_adaptation_parameter_set_id equal to ph_alf_aps_id_luma[i] shall be less than or equal to the TemporalId of the picture associated with the PH.
(c) When ChromaArrayType is equal to 0, the value of aps_chroma_present_flag of the APS NAL unit having aps_params_type equal to ALF_APS and aps_adaptation_parameter_set_id equal to ph_alf_aps_id_luma[i] shall be equal to 0.
(d) When sps_ccalf_enabled_flag is equal to 0, the values of alf_cc_cb_filter_signal_flag and alf_cc_cr_filter_signal_flag of the APS NAL unit having aps_params_type equal to ALF_APS and aps_adaptation_parameter_set_id equal to ph_alf_aps_id_luma[i] shall be equal to 0.

Syntax element ph_alf_cb_flag equal to 0 may specify that the adaptive loop filter is disabled and not applied to the Cb colour component for the current picture. Syntax element ph_alf_cb_flag equal to 1 may specify that the adaptive loop filter is enabled and may be applied to the Cb colour component for the current picture. When ph_alf_cb_flag is not present, it may be inferred to be equal to 0.

Syntax element ph_alf_cr_flag equal to 0 may specify that the adaptive loop filter is disabled and not applied to the Cr colour component for the current picture. Syntax element ph_alf_cr_flag equal to 1 may specify that the adaptive loop filter is enabled and may be applied to the Cr colour component for the current picture. When ph_alf_cr_flag is not present, it may be inferred to be equal to 0.

Syntax element ph_alf_aps_id_chroma may specify the aps_adaptation_parameter_set_id of the ALF_APS that the chroma component of the slices associated with the PH refers to.

When ph_alf_aps_id_chroma is present, the following may apply:
(1) The value of alf_chroma_filter_signal_flag of the APS NAL unit having aps_params_type equal to ALF_APS and aps_adaptation_parameter_set_id equal to ph_alf_aps_id_chroma shall be equal to 1.
(2) The TemporalId of the APS NAL unit having aps_params_type equal to ALF_APS and aps_adaptation_parameter_set_id equal to ph_alf_aps_id_chroma shall be less than or equal to the TemporalId of the picture associated with the PH.
(3) When sps_ccalf_enabled_flag is equal to 0, the values of alf_cc_cb_filter_signal_flag and alf_cc_cr_filter_signal_flag of the APS NAL unit having aps_params_type equal to ALF_APS and aps_adaptation_parameter_set_id equal to ph_alf_aps_id_chroma shall be equal to 0.

Syntax element ph_cc_alf_cb_enabled_flag equal to 1 may specify that cross-component adaptive loop filter for the Cb colour component is enabled and may be used for the current picture. Syntax element ph_cc_alf_cb_enabled_flag equal to 0 may specify that cross-component adaptive loop filter for the Cb colour component is disabled and not used for the current picture. When not present, ph_cc_alf_cb_enabled_flag may be inferred to be equal to 0.

Syntax element ph_cc_alf_cb_aps_id may specify the aps_adaptation_parameter_set_id of the ALF_APS that the Cb colour component of the slices associated with the PH refers to.

When ph_cc_alf_cb_aps_id is present, the following may apply:
(1) The value of alf_cc_cb_filter_signal_flag of the APS NAL unit having aps_params_type equal to ALF_APS and aps_adaptation_parameter_set_id equal to ph_cc_alf_cb_aps_id shall be equal to 1.
(2) The TemporalId of the APS NAL unit having aps_params_type equal to ALF_APS and aps_adaptation_parameter_set_id equal to ph_cc_alf_cb_aps_id shall be less than or equal to the TemporalId of the picture associated with the PH.

Syntax element ph_cc_alf_cr_enabled_flag equal to 1 may specify that cross-component adaptive loop filter for the Cr colour component is enabled and may be used for the current picture. Syntax element ph_cc_alf_cr_enabled_flag equal to 0 may specify that cross-component adaptive loop filter for the Cr colour component is disabled and not used for the current picture. When not present, ph_cc_alf_cr_enabled_flag may be inferred to be equal to 0.

Syntax element ph_cc_alf_cr_aps_id may specify the aps_adaptation_parameter_set_id of the ALF_APS that the Cr colour component of the slices associated with the PH refers to.

When ph_cc_alf_cr_aps_id is present, the following may apply:
(1) The value of alf_cc_cr_filter_signal_flag of the APS NAL unit having aps_params_type equal to ALF_APS and aps_adaptation_parameter_set_id equal to ph_cc_alf_cr_aps_id shall be equal to 1.
(2) The TemporalId of the APS NAL unit having aps_params_type equal to ALF_APS and aps_adaptation_parameter_set_id equal to ph_cc_alf_cr_aps_id shall be less than or equal to the TemporalId of the picture associated with the PH.

Syntax element ph_lmcs_enabled_flag equal to 1 may specify that luma mapping with chroma scaling is enabled and may be used for the current picture. Syntax element ph_lmcs_enabled_flag equal to 0 may specify that luma mapping with chroma scaling is disabled and not used for the current picture. When not present, the value of ph_lmcs_enabled_flag may be inferred to be equal to 0.

Syntax element ph_lmcs_aps_id may specify the aps_adaptation_parameter_set_id of the LMCS APS that the slices associated with the PH refers to.

When ph_lmcs_aps_id is present, the following may apply:
(1) The TemporalId of the APS NAL unit having aps_params_type equal to LMCS_APS and aps_adaptation_parameter_set_id equal to ph_lmcs_aps_id shall be less than or equal to the TemporalId of the picture associated with PH.
(2) When ChromaArrayType is equal to 0, the value of aps_chroma_present_flag of the APS NAL unit having aps_params_type equal to LMCS_APS and aps_adaptation_parameter_set_id equal to ph_lmcs_aps_id shall be equal to 0.
(3) The value of lmcs_delta_cw_prec_minus1 of the APS NAL unit having aps_params_type equal to LMCS_APS and aps_adaptation_parameter_set_id equal to ph_lmcs_aps_id shall be in the range of 0 to BitDepth-2, inclusive.

Syntax element ph_chroma_residual_scale_flag equal to 1 may specify that chroma residual scaling is enabled and may be used for the current picture. Syntax element ph_chroma_residual_scale_flag equal to 0 may specify that chroma residual scaling is disabled and not used for the current picture. When ph_chroma_residual_scale_flag is not present, it may be inferred to be equal to 0. According to an embodiment, when the current picture is a GDR picture or a recovering picture of a GDR picture, and the current picture contains a non-CTU-aligned boundary between a "refreshed area" (i.e., an area that has an exact match of decoded sample values when starting the decoding process from the GDR picture compared to starting the decoding process from the previous IRAP picture in decoding order, when present) and a "dirty area" (i.e., an area that might not have an exact match of decoded sample values when starting the decoding process from the GDR picture compared to starting the decoding process from the previous IRAP picture in decoding order, when present), chroma residual scaling of LMCS may be disabled in the current picture to avoid the "dirty area" to affect decoded sample values of the "refreshed area".

Syntax element ph_explicit_scaling_list_enabled_flag equal to 1 may specify that the explicit scaling list is enabled and may be used for the current picture in the scaling process for transform coefficients when decoding a slice. Syntax element ph_explicit_scaling_list_enabled_flag equal to 0 may specify that the explicit scaling list is disabled and not used for the picture. When not present, the value of ph_explicit_scaling_list_enabled_flag may be inferred to be equal to 0.

Syntax element ph_scaling_list_aps_id may specify the aps_adaptation_parameter_set_id of the scaling list APS.

When ph_scaling_list_aps_id is present, the following may apply:
(1) The TemporalId of the APS NAL unit having aps_params_type equal to SCALING_APS and aps_adaptation_parameter_set_id equal to ph_scaling_list_aps_id shall be less than or equal to the TemporalId of the picture associated with PH.
(2) The value of aps_chroma_present_flag of the APS NAL unit having aps_params_type equal to SCALING_APS and aps_adaptation_parameter_set_id equal to ph_scaling_list_aps_id shall be equal to ChromaArrayType==0?0:1.

Syntax element ph_virtual_boundaries_present_flag equal to 1 may specify that information of virtual boundaries is signalled in the PH. Syntax element ph_virtual_boundaries_present_flag equal to 0 may specify that information of virtual boundaries is not signalled in the PH. When there is one or more than one virtual boundaries signalled in the PH, the in-loop filtering operations may be disabled across the virtual boundaries in the picture. The in-loop filtering operations may include deblocking filter, sample adaptive offset filter, and adaptive loop filter operations. When not present, the value of ph_virtual_boundaries_present_flag may be inferred to be equal to 0.

It may be a requirement of bitstream conformance that, when sps_subpic_info_present_flag is equal to 1, the value of ph_virtual_boundaries_present_flag be equal to 0.

The variable VirtualBoundariesPresentFlag may be derived as follows:
  VirtualBoundariesPresentFlag=0
  if (sps_virtual_boundaries_enabled_flag)
    VirtualBoundariesPresentFlag=sps_virtual_boundaries_present_flag||ph_virtual_boundaries_present_flag Syntax element ph_num_ver_virtual_boundaries may specify the number of ph_virtual_boundary_pos_x[i] syntax elements that are present in the PH. When ph_num_ver_virtual_boundaries is not present, it may be inferred to be equal to 0.

The variable NumVerVirtualBoundaries may be derived as follows:
  NumVerVirtualBoundaries=0
  if (sps_virtual_boundaries_enabled_flag)
    NumVerVirtualBoundaries=sps_virtual_boundaries_present_flag?sps_num_ver_virtual_boundaries:ph_num_ver_virtual_boundaries Syntax element ph_virtual_boundary_pos_x[i] may specify the location of the i-th vertical virtual boundary in units of luma samples divided by 8. The value of ph_virtual_boundary_pos_x[i] may be required to be in the range of 1 to Ceil(pps_pic_width_in_luma_samples÷8)−1, inclusive.

The list VirtualBoundaryPosX[i] for i ranging from 0 to NumVerVirtualBoundaries-1, inclusive, in units of luma samples, specifying the locations of the vertical virtual boundaries, may be derived as follows:
  for (i=0; i<NumVerVirtualBoundaries; i++)

VirtualBoundaryPosX[i]=(sps_virtual_boundaries_present_flag?sps_virtual_boundary_pos_x[i]:ph_virtual_boundary_pos_x[i])*8

The distance between any two vertical virtual boundaries may be required to be greater than or equal to CtbSizeY luma samples.

Syntax element ph_num_hor_virtual_boundaries may specify the number of ph_virtual_boundary_pos_y[i] syntax elements that are present in the PH. When ph_num_hor_virtual_boundaries is not present, it may be inferred to be equal to 0.

The parameter NumHorVirtualBoundaries may be derived as follows:
NumHorVirtualBoundaries=0
if (sps_virtual_boundaries_enabled_flag)

NumHorVirtualBoundaries=sps_virtual_boundaries_present_
flag?sps_num_hor_virtual_boundaries:ph_num_
hor_virtual_boundaries When sps_virtual_boundaries_enabled_flag is equal to 1 and ph_virtual_boundaries_present_flag is equal to 1, the sum of ph_num_ver_virtual_boundaries and ph_num_hor_virtual_boundaries may be required to be greater than 0.

Syntax element ph_virtual_boundary_pos_y[i] may specify the location of the i-th horizontal virtual boundary in units of luma samples divided by 8. The value of ph_virtual_boundary_pos_y[i] may be required to be in the range of 1 to Ceil(pps_pic_height_in_luma_samples÷8)−1, inclusive.

The list VirtualBoundaryPosY[i] for i ranging from 0 to NumHorVirtualBoundaries−1, inclusive, in units of luma samples, specifying the locations of the horizontal virtual boundaries, may be derived as follows:
for (i=0; i<NumHorVirtualBoundaries; i++)

VirtualBoundaryPosY[i]=(sps_virtual_boundar-
ies_present_flag?sps_virtual_boundary_pos_y[i]:
ph_virtual_boundary_pos_y[i])*8

The distance between any two horizontal virtual boundaries may be required to be greater than or equal to CtbSizeY luma samples.

Syntax element ph_pic_output_flag may affect the decoded picture output and removal processes. When ph_pic_output_flag is not present, it may be inferred to be equal to 1. According to an embodiment, there may be no picture in the bitstream that has ph_non_ref_pic_flag equal to 1 and ph_pic_output_flag equal to 0.

Syntax element ph_partition_constraints_override_flag equal to 1 may specify that partition constraint parameters are present in the PH. Syntax element ph_partition_constraints_override_flag equal to 0 may specify that partition constraint parameters are not present in the PH. When not present, the value of ph_partition_constraints_override_flag may be inferred to be equal to 0.

Syntax element ph_log2_diff_min_qt_min_cb_intra_slice_luma may specify the difference between the base 2 logarithm of the minimum size in luma samples of a luma leaf block resulting from quadtree splitting of a coding tree unit (CTU) and the base 2 logarithm of the minimum coding block size in luma samples for luma CUs in the slices with sh_slice_type equal to 2 (I) associated with the PH. The value of ph_log2_diff_min_qt_min_cb_intra_slice_luma may be required to be in the range of 0 to Min(6, CtbLog 2SizeY)−MinCbLog 2SizeY, inclusive. When not present, the value of ph_log2_diff_min_qt_min_cb_luma may be inferred to be equal to sps_log2_diff_min_qt_min_cb_intra_slice_luma.

Syntax element ph_max_mtt_hierarchy_depth_intra_slice_luma may specify the maximum hierarchy depth for coding units resulting from multi-type tree splitting of a quadtree leaf in slices with sh_slice_type equal to 2 (I) associated with the PH. The value of ph_max_mtt_hierarchy_depth_intra_slice_luma may be required to be in the range of 0 to 2*(CtbLog 2SizeY−MinCbLog 2SizeY), inclusive. When not present, the value of ph_max_mtt_hierarchy_depth_intra_slice_luma may be inferred to be equal to sps_max_mtt_hierarchy_depth_intra_slice_luma.

Syntax element ph_log2_diff_max_bt_min_qt_intra_slice_luma may specify the difference between the base 2 logarithm of the maximum size (width or height) in luma samples of a luma coding block that can be split using a binary split and the minimum size (width or height) in luma samples of a luma leaf block resulting from quadtree splitting of a CTU in slices with sh_slice_type equal to 2 (I) associated with the PH. The value of ph_log2_diff_max_bt_min_qt_intra_slice_luma may be required to be in the range of 0 to (sps_qtbtt_dual_tree_intra_flag?Min(6, CtbLog 2SizeY): CtbLog 2SizeY)−MinQtLog 2SizeIntraY, inclusive. When not present, the value of ph_log2_diff_max_bt_min_qt_intra_slice_luma may be inferred to be equal to sps_log2_diff_max_bt_min_qt_intra_slice_luma.

Syntax element ph_log2_diff_max_tt_min_qt_intra_slice_luma may specify the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with sh_slice_type equal to 2 (I) associated with the PH. The value of ph_log2_diff_max_tt_min_qt_intra_slice_luma may be required to be in the range of 0 to Min(6, CtbLog 2SizeY)−MinQtLog 2SizeIntraY, inclusive. When not present, the value of ph_log2_diff_max_tt_min_qt_intra_slice_luma may be inferred to be equal to sps_log2_diff_max_tt_min_qt_intra_slice_luma.

Syntax element ph_log2_diff_min_qt_min_cb_intra_slice_chroma may specify the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with sh_slice_type equal to 2 (I) associated with the PH. The value of ph_log2_diff_min_qt_min_cb_intra_slice_chroma may be required to be in the range of 0 to Min(6, CtbLog 2SizeY)−MinCbLog 2SizeY, inclusive. When not present, the value of ph_log2_diff_min_qt_min_cb_intra_slice_chroma may be inferred to be equal to sps_log2_diff_min_qt_min_cb_intra_slice_chroma.

Syntax element ph_max_mtt_hierarchy_depth_intra_slice_chroma may specify the maximum hierarchy depth for chroma coding units resulting from multi-type tree splitting of a chroma quadtree leaf with treeType equal to DUAL_TREE_CHROMA in slices with sh_slice_type equal to 2 (I) associated with the PH. The value of ph_max_mtt_hierarchy_depth_intra_slice_chroma may be required to be in the range of 0 to 2*(CtbLog 2SizeY-MinCbLog 2SizeY), inclusive. When not present, the value of ph_max_mtt_hierarchy_depth_intra_slice_chroma may be inferred to be equal to sps_max_mtt_hierarchy_depth_intra_slice_chroma.

Syntax element ph_log2_diff_max_bt_min_qt_intra_slice_chroma may specify the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with sh_slice_type equal to 2 (I) associated with the PH. The value of ph_log2_diff_max_bt_min_qt_intra_slice_chroma may be required to be in the range of 0 to Min(6, CtbLog 2SizeY)−MinQtLog 2SizeIntraC, inclusive. When not present, the value of ph_log2_diff_max_bt_min_qt_intra_slice_chroma may be inferred to be equal to sps_log2_diff_max_bt_min_qt_intra_slice_chroma.

Syntax element ph_log2_diff_max_tt_min_qt_intra_slice_chroma may specify the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with sh_slice_type equal to 2 (I) associated with the PH. The value of ph_log2_diff_max_tt_min_qt_intra_slice_chroma may be required to be in the range of 0 to Min(6, CtbLog 2SizeY)−MinQtLog 2SizeIntraC, inclusive. When not present, the value of ph_log2_diff_max_tt_min_qt_intra_slice_chroma may be inferred to be equal to sps_log2_diff_max_tt_min_qt_intra_slice_chroma Syntax element ph_cu_qp_delta_subdiv_intra_slice may specify the maximum cbSubdiv value of coding units in intra slice that convey cu_qp_delta_abs and cu_qp_delta_sign_flag. The value of ph_cu_qp_delta_subdiv_intra_slice may be required to be in the range of 0 to 2*(CtbLog 2SizeY−MinQtLog 2SizeIntraY+ph_max_mtt_hierarchy_depth_intra_slice_lu ma), inclusive. When not present, the value of ph_cu_qp_delta_subdiv_intra_slice may be inferred to be equal to 0.

Syntax element ph_cu_chroma_qp_offset_subdiv_intra_slice may specify the maximum cbSubdiv value of coding units in intra slice that convey cu_chroma_qp_offset_flag. The value of ph_cu_chroma_qp_offset_subdiv_intra_slice may be required to be in the range of 0 to 2*(CtbLog 2SizeY−MinQtLog 2SizeIntraY+ph_max_mtt_hierarchy_depth_intra_slice_lu ma), inclusive. When not present, the value of ph_cu_chroma_qp_offset_subdiv_intra_slice may be inferred to be equal to 0.

Syntax element ph_log2_diff_min_qt_min_cb_inter_slice may specify the difference between the base 2 logarithm of the minimum size in luma samples of a luma leaf block resulting from quadtree splitting of a CTU and the base 2 logarithm of the minimum luma coding block size in luma samples for luma CUs in the slices with sh_slice_type equal to 0 (B) or 1 (P) associated with the PH. The value of ph_log2_diff_min_qt_min_cb_inter_slice may be required to be in the range of 0 to Min(6, CtbLog 2SizeY)−MinCbLog 2SizeY, inclusive. When not present, the value of ph_log2_diff_min_qt_min_cb_luma may be inferred to be equal to sps_log2_diff_min_qt_min_cb_inter_slice.

Syntax element ph_max_mtt_hierarchy_depth_inter_slice may specify the maximum hierarchy depth for coding units resulting from multi-type tree splitting of a quadtree leaf in slices with sh_slice_type equal to 0 (B) or 1 (P) associated with the PH. The value of ph_max_mtt_hierarchy_depth_inter_slice may be required to be in the range of 0 to 2*(CtbLog 2SizeY−MinCbLog 2SizeY), inclusive. When not present, the value of ph_max_mtt_hierarchy_depth_inter_slice may be inferred to be equal to sps_max_mtt_hierarchy_depth_inter_slice.

Syntax element ph_log2_diff_max_bt_min_qt_inter_slice may specify the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with sh_slice_type equal to 0 (B) or 1 (P) associated with the PH. The value of ph_log2_diff_max_bt_min_qt_inter_slice may be required to be in the range of 0 to CtbLog 2SizeY−MinQtLog 2SizeInterY, inclusive. When not present, the value of ph_log2_diff_max_bt_min_qt_inter_slice may be inferred to be equal to sps_log2_diff_max_bt_min_qt_inter_slice.

Syntax element ph_log2_diff_max_tt_min_qt_inter_slice may specify the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with sh_slice_type equal to 0 (B) or 1 (P) associated with the PH. The value of ph_log2_diff_max_tt_min_qt_inter_slice may be required to be in the range of 0 to Min(6, CtbLog 2SizeY)−MinQtLog 2SizeInterY, inclusive. When not present, the value of ph_log2_diff_max_tt_min_qt_inter_slice may be inferred to be equal to sps_log2_diff_max_tt_min_qt_inter_slice.

Syntax element ph_cu_qp_delta_subdiv_inter_slice may specify the maximum cbSubdiv value of coding units that in inter slice convey cu_qp_delta_abs and cu_qp_delta_sign_flag. The value of ph_cu_qp_delta_subdiv_inter_slice may be required to be in the range of 0 to 2*(CtbLog 2SizeY−MinQtLog 2SizeInterY+ph_max_mtt_hierarchy_depth_inter_slice), inclusive. When not present, the value of ph_cu_qp_delta_subdiv_inter_slice may be inferred to be equal to 0.

Syntax element ph_cu_chroma_qp_offset_subdiv_inter_slice may specify the maximum cbSubdiv value of coding units in inter slice that convey cu_chroma_qp_offset_flag. The value of ph_cu_chroma_qp_offset_subdiv_inter_slice may be required to be in the range of 0 to 2*(CtbLog 2SizeY−MinQtLog 2SizeInterY+ph_max_mtt_hierarchy_depth_inter_slice), inclusive. When not present, the value of ph_cu_chroma_qp_offset_subdiv_inter_slice may be inferred to be equal to 0.

Syntax element ph_temporal_mvp_enabled_flag equal to 0 may specify that temporal motion vector predictor is disabled and not used in decoding of the slices in the current picture. Syntax element ph_temporal_mvp_enabled_flag equal to 1 may specify that temporal motion vector predictors is enabled and may be used in decoding of the slices in the current picture. When not present, the value of ph_temporal_mvp_enabled_flag may be inferred to be equal to 0. According to an embodiment, due to the other existing constraints, the value of ph_temporal_mvp_enabled_flag may only be equal to 0 in a conforming bitstream when one or more of the following conditions are true: (1) no reference picture in the DPB has the same spatial resolution and the same scaling window offsets as the current picture, and 2) no reference picture in the decoded picture buffer (DPB) exists in the active entries of the reference picture lists (RPLs) of all slices in the current picture. There may be other conditions under which ph_temporal_mvp_enabled_flag can only be equal to 0 that are not listed.

The maximum number of subblock-based merging MVP candidates, MaxNumSubblockMergeCand, may be derived as follows:

```
if( sps_affine_enabled_flag )
    MaxNumSubblockMergeCand = 5 –
    sps_five_minus_max_num_subblock_merge_cand
else
    MaxNumSubblockMergeCand =
    sps_sbtmvp_enabled_flag && ph_temporal_mvp_enabled_flag
```

The value of MaxNumSubblockMergeCand may be required to be in the range of 0 to 5, inclusive.

Syntax element ph_collocated_from_l0_flag equal to 1 may specify that the collocated picture used for temporal motion vector prediction is derived from reference picture list 0. Syntax element ph_collocated_from_l0_flag equal to 0 may specify that the collocated picture used for temporal motion vector prediction is derived from reference picture list 1. When ph_temporal_mvp_enabled_flag and pps_rpl_info_in_ph_flag are both equal to 1 and num_ref_entries[1][RplsIdx[1] ] is equal to 0, the value of ph_collocated_from_l0_flag may be inferred to be equal to 1.

Syntax element ph_collocated_ref_idx may specify the reference index of the collocated picture used for temporal motion vector prediction.

When ph_collocated_from_l0_flag is equal to 1, ph_collocated_ref_idx may refer to an entry in reference picture list 0, and the value of ph_collocated_ref_idx may be required to be in the range of 0 to num_ref_entries[0][RplsIdx[0] ]–1, inclusive. When ph_collocated_from_l0_flag is equal to 0, ph_collocated_ref_idx may refer to an entry in reference picture list 1, and the value of ph_collocated_ref_idx may be required to be in the range of 0 to num_ref_entries[1] [RplsIdx[1] ]–1, inclusive. When not present, the value of ph_collocated_ref_idx may be inferred to be equal to 0.

Syntax element ph_mmvd_fullpel_only_flag equal to 1 may specify that merge mode with motion vector difference uses integer sample precision in the slices associated with the PH. Syntax element ph_mmvd_fullpel_only_flag equal to 0 may specify that merge mode with motion vector difference may use fractional sample precision in the slices associated with the PH. When not present, the value of ph_mmvd_fullpel_only_flag may be inferred to be 0.

Syntax element ph_mvd_l1_zero_flag equal to 1 may specify that the mvd_coding(x0, y0, 1, cpIdx) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. Syntax element ph_mvd_l1_zero_flag equal to 0 may specify that the mvd_coding(x0, y0, 1, cpIdx) syntax structure is parsed. When not present, the value of ph_mvd_l1_zero_flag may be inferred to be 1.

Syntax element ph_bdof_disabled_flag equal to 1 may specify that bi-directional optical flow inter prediction based inter bi-prediction is disabled and not used in the slices associated with the PH. Syntax element ph_bdof_disabled_flag equal to 0 may specify that bi-directional optical flow inter prediction based inter bi-prediction is enabled and may be used in the slices associated with the PH.

When not present, the value of ph_bdof_disabled_flag may be inferred as follows:
(1) If sps_bdof_control_present_in_ph_flag is equal to 0, the value of ph_bdof_disabled_flag is inferred to be equal to 1–sps_bdof_enabled_flag.
(2) Otherwise (sps_bdof_control_present_in_ph_flag is equal to 1), the value of ph_bdof_disabled_flag is inferred to be equal to 1.

Syntax element ph_dmvr_disabled_flag equal to 1 may specify that decoder motion vector refinement-based inter bi-prediction is disabled and not used in the slices associated with the PH. Syntax element ph_dmvr_disabled_flag equal to 0 may specify that decoder motion vector refinement-based inter bi-prediction is enabled and may be used in the slices associated with the PH.

When not present, the value of ph_dmvr_disabled_flag may be inferred as follows:
(1) If sps_dmvr_control_present_in_ph_flag is equal to 0, the value of ph_dmvr_disabled_flag is inferred to be equal to 1–sps_dmvr_enabled_flag.
(2) Otherwise (sps_dmvr_control_present_in_ph_flag is equal to 1), the value of ph_dmvr_disabled_flag is inferred to be equal to 1.

Syntax element ph_prof_disabled_flag equal to 1 may specify that prediction refinement with optical flow is disabled and not used in the slices associated with the PH. Syntax element ph_prof_disabled_flag equal to 0 may specify that prediction refinement with optical flow is enabled and may be used in the slices associated with the PH.

When ph_prof_disabled_flag is not present, the following may apply:
(1) If sps_affine_prof_enabled_flag is equal to 1, the value of ph_prof_disabled_flag is inferred to be equal to 0.
(2) Otherwise (sps_affine_prof_enabled_flag is equal to 0), the value of ph_prof_disabled_flag is inferred to be equal to 1.

Syntax element ph_qp_delta may specify the initial value of $Qp_Y$ to be used for the coding blocks in the picture until modified by the value of CuQpDeltaVal in the coding unit layer.

When pps_qp_delta_info_in_ph_flag is equal to 1, the initial value of the $Qp_Y$ quantization parameter for all slices of the picture, $SliceQp_Y$, may be derived as follows:

$$SliceQp_Y = 26 + pps\_init\_qp\_minus26 + ph\_qp\_delta$$

The value of $SliceQp_Y$ may be required to be in the range of –QpBdOffset to +63, inclusive.

Syntax element ph_joint_cbcr_sign_flag may specify whether, in transform units with tu_joint_cbcr_residual_flag [x0][y0] equal to 1, the collocated residual samples of both chroma components have inverted signs. When tu_joint_cbcr_residual_flag[x0][y0] is equal to 1 for a transform unit, ph_joint_cbcr_sign_flag equal to 0 may specify that the sign of each residual sample of the Cr (or Cb) component is identical to the sign of the collocated Cb (or Cr) residual sample and ph_joint_cbcr_sign_flag equal to 1 may specify that the sign of each residual sample of the Cr (or Cb) component is given by the inverted sign of the collocated Cb (or Cr) residual sample.

Syntax element ph_sao_luma_enabled_flag equal to 1 may specify that sample adaptive offset (SAO) is enabled and may be used for the luma component of the current picture. Syntax element ph_sao_luma_enabled_flag equal to 0 may specify that SAO is disabled and not used for the luma component of the current picture. When ph_sao_luma_enabled_flag is not present, it may be inferred to be equal to 0.

Syntax element ph_sao_chroma_enabled_flag equal to 1 may specify that SAO is enabled and may be used for the chroma component of the current picture. Syntax element ph_sao_chroma_enabled_flag equal to 0 may specify that SAO is disabled and not used for the chroma component of the current picture. When ph_sao_chroma_enabled_flag is not present, it may be inferred to be equal to 0.

Syntax element ph_deblocking_filter_override_flag equal to 1 may specify that deblocking parameters are present in the PH. Syntax element ph_deblocking_filter_override_flag equal to 0 may specify that deblocking parameters are not present in the PH. When not present, the value of ph_deblocking_filter_override_flag may be inferred to be equal to 0.

Syntax element ph_deblocking_filter_disabled_flag equal to 1 may specify that the operation of the deblocking filter is not applied for the slices associated with the PH for which sh_deblocking_filter_disabled_flag is not present in the sequence headers (SHs) and inferred to be equal to 1 or is present in the SHs and equal to 1, and also may specify that the operation of the deblocking filter is applied for the slices associated with the PH for which sh_deblocking_filter_disabled_flag is not present in the SHs and inferred to be equal to 0 or is present in the SHs and equal to 0.

Syntax element ph_deblocking_filter_disabled_flag equal to 0 may specify that the operation of the deblocking filter is applied for the slices associated with the PH for which sh_deblocking_filter_disabled_flag is not present in the SHs and inferred to be equal to 0 or is present in the SHs and equal to 0, and also may specify that the operation of the deblocking filter is not applied for the slices associated with the PH for which sh_deblocking_filter_disabled_flag is not present in the SHs and inferred to be equal to 1 or is present in the SHs and equal to 1.

When ph_deblocking_filter_disabled_flag is not present, it may be inferred as follows:
(1) If pps_deblocking_filter_disabled_flag and ph_deblocking_filter_override_flag are both equal to 1, the value of ph_deblocking_filter_disabled_flag is inferred to be equal to 0.
(2) Otherwise (pps_deblocking_filter_disabled_flag or ph_deblocking_filter_override_flag is equal to 0), the value of ph_deblocking_filter_disabled_flag is inferred to be equal to pps_deblocking_filter_disabled_flag.

Syntax elements ph_luma_beta_offset_div2 and ph_luma_tc_offset_div2 may specify the deblocking parameter offsets for β and tC (divided by 2) that are applied to the luma component for the slices associated with the PH. The values of ph_luma_beta_offset_div2 and ph_luma_tc_offset_div2 may be required to be both be in the range of −12 to 12, inclusive. When not present, the values of ph_luma_beta_offset_div2 and ph_luma_tc_offset_div2 may be inferred to be equal to pps_luma_beta_offset_div2 and pps_luma_tc_offset_div2, respectively.

Syntax elements ph_cb_beta_offset_div2 and ph_cb_tc_offset_div2 may specify the deblocking parameter offsets for β and tC (divided by 2) that are applied to the Cb component for the slices associated with the PH. The values of ph_cb_beta_offset_div2 and ph_cb_tc_offset_div2 may be required to both be in the range of −12 to 12, inclusive. When not present, the values of ph_cb_beta_offset_div2 and ph_cb_tc_offset_div2 may be inferred to be equal to ph_luma_beta_offset_div2 and ph_luma_tc_offset_div2, respectively.

Syntax elements ph_cr_beta_offset_div2 and ph_cr_tc_offset_div2 may specify the deblocking parameter offsets for β and tC (divided by 2) that are applied to the Cr component for the slices associated with the PH. The values of ph_cr_beta_offset_div2 and ph_cr_tc_offset_div2 may be required to be both be in the range of −12 to 12, inclusive. When not present, the values of ph_cr_beta_offset_div2 and ph_cr_tc_offset_div2 may be inferred to be equal to ph_luma_beta_offset_div2 and ph_luma_tc_offset_div2, respectively.

Syntax element ph_extension_length may specify the length of the PH extension data in bytes, not including the bits used for signalling ph_extension_length itself. The value of ph_extension_length may be required to be in the range of 0 to 256, inclusive. When not present, the value of ph_extension_length may be inferred to be equal to 0.

Syntax element ph_extension_data_byte may have any value. Decoders may be required to ignore the value of ph_extension_data_byte. Its value may not affect decoder conformance to specified profiles.

4. Profile

4.1 Main 10 and Main 10 Still Picture profile

Bitstreams conforming to the Main 10 or Main 10 Still Picture profile may be required to obey the following constraints.
(1) In a bitstream conforming to the Main 10 Still Picture profile, the bitstream may be required to contain only one picture.
(2) Referenced SPSs may be required to have sps_chroma_format_idc equal to 0 or 1.
(3) Referenced SPSs may be required to have sps_bit_depth_minus8 in the range of 0 to 2, inclusive.
(4) In a bitstream conforming to the Main 10 Still Picture profile, the referenced SPS may be required to have max_dec_pic_buffering_minus1[sps_max_sublayers_minus1] equal to 0.
(5) Referenced SPSs may be required to have sps_palette_enabled_flag equal to 0.
(6) In a bitstream conforming to a Main 10 profile that does not conform to the Main 10 Still Picture profile, general_level_idc and sublayer_level_idc[i] for all values of i in the referenced VPS (when available) and in the referenced SPSs may be required to not be equal to 255 (which indicates level 15.5).
(7) The tier and level constraints specified for the Main 10 or Main 10 Still Picture profile, as applicable, may be required to be fulfilled.
(8) Conformance of a bitstream to the Main 10 profile may be indicated by general_profile_idc being equal to 1.
(9) Conformance of a bitstream to the Main 10 Still Picture profile may be indicated by general_one_picture_only_constraint_flag being equal to 1 together with general_profile_idc being equal to 1.

According to an embodiment, when the conformance of a bitstream to the Main 10 Still Picture profile is indicated as specified above, and the indicated level is not level 15.5, the conditions for indication of the conformance of the bitstream to the Main 10 profile are also fulfilled.

Decoders conforming to the Main 10 profile at a specific level of a specific tier may be required to be capable of decoding all bitstreams for which all of the following conditions apply:
(1) The bitstream is indicated to conform to the Main 10 or Main 10 Still Picture profile.
(2) The bitstream is indicated to conform to a tier that is lower than or equal to the specified tier.
(3) The bitstream is indicated to conform to a level that is not level 15.5 and is lower than or equal to the specified level.
(4) Decoders conforming to the Main 10 Still Picture profile at a specific level of a specific tier may be required to be capable of decoding all bitstreams for which all of the following conditions apply:

(4) The bitstream is indicated to conform to the Main 10 Still Picture profile.

(5) The bitstream is indicated to conform to a tier that is lower than or equal to the specified tier.

(6) The bitstream is indicated to conform to a level that is not level 15.5 and is lower than or equal to the specified level.

4.2 Main 4:4:4 10 and Main 4:4:4 10 Still Picture Profile

Bitstreams conforming to the Main 4:4:4 10 or Main 4:4:4 10 Still Picture profile may be required to obey the following constraints:

(1) In a bitstream conforming to the Main 4:4:4 10 Still Picture profile, the bitstream may be required to contain only one picture.

(2) Referenced SPSs may be required to have sps_chroma_format_idc in the range of 0 to 3, inclusive.

(3) Referenced SPSs may be required to have sps_bit_depth_minus8 in the range of 0 to 2, inclusive.

(4) In a bitstream conforming to the Main 4:4:4 10 Still Picture profile, the referenced SPS may be required to have max_dec_pic_buffering_minus1[sps_max_sublayers_minus1] equal to 0.

(5) In a bitstream conforming to the Main 4:4:4 10 profile that does not conform to the Main 4:4:4 10 Still Picture profile, general_level_idc and sublayer_level_idc[i] for all values of i in the referenced VPS (when available) and in the referenced SPSs may be required to not be equal to 255 (which indicates level 15.5).

(6) The tier and level constraints specified for the Main 4:4:4 10 or Main 4:4:4 10 Still Picture profile, as applicable, may be required to be fulfilled.

(7) Conformance of a bitstream to the Main 4:4:4 10 profile is indicated by general_profile_idc being equal to 2.

(8) Conformance of a bitstream to the Main 4:4:4 10 Still Picture profile is indicated by general_one_picture_only_constraint_flag being equal to 1 together with general_profile_idc being equal to 2.

According to an embodiment, when the conformance of a bitstream to the Main 10 4:4:4 Still Picture profile is indicated as specified above, and the indicated level is not level 15.5, the conditions for indication of the conformance of the bitstream to the Main 10 4:4:4 profile are also fulfilled.

Decoders conforming to the Main 4:4:4 10 profile at a specific level of a specific tier may be capable of decoding all bitstreams for which all of the following conditions apply:

(1) The bitstream is indicated to conform to the Main 4:4:4 10, Main 10, Main 4:4:4 10 Still Picture, or Main 10 Still Picture profile.

(2) The bitstream is indicated to conform to a tier that is lower than or equal to the specified tier.

(3) The bitstream is indicated to conform to a level that is not level 15.5 and is lower than or equal to the specified level.

Decoders conforming to the Main 4:4:4 10 Still Picture profile at a specific level of a specific tier may be required to be capable of decoding all bitstreams for which all of the following conditions apply:

(1) The bitstream is indicated to conform to the Main 4:4:4 10 Still Picture or Main 10 Still Picture profile.

(2) The bitstream is indicated to conform to a tier that is lower than or equal to the specified tier.

(3) The bitstream is indicated to conform to a level that is not level 15.5 and is lower than or equal to the specified level.

5. SPS Signaling

Previously, an SPS-level flag (sps_inter_allowed_flag) was proposed to indicate that only intra slices are exist in the sequence, and the flag is used to skip signaling of inter coding related syntax elements to reduce redundancy. When sps_inter_allowed_flag is equal to 1, inter coding related syntax elements could exist in the SPS. When sps_inter_allowed_flag is equal to 0, only intra coding related syntax elements could exist in the SPS.

Additionally, an PPS-level flag (pps_inter_allowed_flag) was proposed to indicate that only intra slices exist in the sequence, and the flag is used to skip signaling of inter coding related syntax elements to reduce redundancy. When pps_inter_allowed_flag is equal to 1, inter coding related syntax elements could exist in the PPS. When pps_inter_allowed_flag is equal to 0, only intra coding related syntax elements could exist in the PPS.

6. Constraint on Syntax Element for Still Picture Profiles

Embodiments of the present disclosure may be used separately or combined in any order. Further, each of the embodiments (e.g. methods, encoders, and decoders) may be implemented by processing circuitry (e.g., one or more processors or one or more integrated circuits). In one example, the one or more processors execute a program that is stored in a non-transitory computer-readable medium. Embodiments of the present disclosure may provide changes to the VVC Draft 8 vE. Aspects of embodiments of the present disclosure are described below.

Aspect 1: Embodiments may have an all intra profile in VVC. The all intra profile may include a constraint that all the slices conforming to this profile are intra only.

Aspect 2: Embodiments may have a still picture profile in VVC. Still picture profile may include a constraint that all the slices conforming to this profile have intra only. Still picture profile may be used for still photography for cameras, computer generated images or for extraction of snapshots from video sequences. This profile may be a subset of the capabilities of the Main 10 profile described above in subsection 4.1 ("Main 10 and Main 10 Still Picture profile").

Aspect 3: Embodiments may include a one_picture_only_constraint_flag in VVC. The syntax element one_picture_only_constraint_flag equal to 1 may specify (e.g. to the docoder) that slice_type shall be equal to I slice and that there is only one picture existing in the bitstream. The syntax element one_picture_only_constraint_flag equal to 0 may not impose such a constraint.

Aspect 3.1: In one embodiment, one_picture_only_constraint_flag may be signalled (e.g. to the decoder) in the profile_tier_level ( ) as shown below in TABLES 5 and 6.

TABLE 5

| Profile tier level 0 | |
| --- | --- |
|  | Descriptor |
| profile_tier_level( profileTierPresentFlag,<br>maxNumSubLayersMinus1 ) {<br>  if( profileTierPresentFlag ) {<br>    general_profile_idc | u(7) |

TABLE 5-continued

Profile tier level 0

| | Descriptor |
|---|---|
|     general_tier_flag | u(1) |
|     general_constraint_info( ) | |
|   } | |
|     general_level_idc | u(8) |
|     ... | |
| } | |

TABLE 6

General constraint info( )

| | Descriptor |
|---|---|
| general_constraint_info( ) { | |
|     general_progressive_source_flag | u(1) |
|     general_interlaced_source_flag | u(1) |
|     general_non_packed_constraint_flag | u(1) |
|     general_frame_only_constraint_flag | u(1) |
|     general_non_projected_constraint_flag | u(1) |
|     one_picture_only_constraint_flag | u(1) |
|     intra_only_constraint_flag | u(1) |
|     ... | |
| } | |

Aspect 4: In addition to Aspect 3 above, embodiments may have a constraint(s) between intra_only_constraint_flag and one_picture_only_constraint_flag.

Aspect 4.1: In one embodiment, one_picture_only_constraint_flag is signaled before intra_only_constraint_flag, and when one_picture_only_constraint_flag is 1, bitstream conformance may require that intra_only_constraint_flag also be 1.

Syntax element one_picture_only_constraint_flag equal to 1 may specify (e.g. to the decoder) that slice_type shall be equal to I slice and there is only one picture existing in the bitstream. Syntax element one_picture_only_constraint_flag equal to 0 may not impose such a constraint.

Syntax element intra_only_constraint_flag equal to 1 may specify (e.g. to the decoder) that slice_type shall be equal to I. Syntax element intra_only_constraint_flag equal to 0 may not impose such a constraint. Bitstream conformance may require that when one_picture_only_constraint_flag is 1, intra_only_constraint_flag be 1.

In one embodiment, when one_picture_only_constraint_flag is equal to 1, the picture may be an IRAP picture, such as IDR or CRA.

Aspect 4.3: In one embodiment, when one_picture_only_constraint_flag is equal to 1, VPS is not present and the number of layers may be equal to 1.

Aspect 4.4: In one embodiment, when one_picture_only_constraint_flag is equal to 1, reference picture list and picture order count may not be present in picture header or slice header.

Aspect 4.5: In one embodiment, when one_picture_only_constraint_flag is equal to 1, access unit delimiter (AUD) and end of stream (EOS) NAL units may not present in the bitstream.

Aspect 5: In addition to Aspect 1, for all intra profile, intra_only_constraint_flag may be required to have a value 1. Therefore, in all intra profile, only intra slices can exist in the bitstream.

Aspect 6: In addition to Aspects 2 and 3, for still picture profile, one_picture_only_constraint_flag may have a value 1 and intra_only_constraint_flag may have a value 1. Therefore, in still picture profile, only intra slices can exist in the bitstream and only one picture exists in the bitstream.

Aspect 7: In addition to Aspects 2 and 4, for still picture profile, one_picture_only_constraint_flag may have a value 1. Therefore, in still picture profile, only intra slices can exist in the bitstream and only one picture exists in the bitstream.

Aspect 8: When intra_only_constraint_flag is present and equal to 1, non-intra related syntax element may not be signalled.

Aspect 8.1: In one embodiment, when intra_only_constraint_flag is present and equal to 1, both sps_inter_allowed_flag and pps_inter_allowed_flag described above in subsection 5 ("SPS signaling") have a value of 0. When intra_only_constraint_flag is not present or has a value equal to 0, such constraint may not apply to sps_inter_allowed_flag and pps_inter_allowed_flag.

Aspect 9: When one_picture_only_constraint_flag is present and equal to 1, non-intra related syntax elements may not be signalled.

Aspect 9.1: In one embodiment, when one_picture_only_constraint_flag is present and equal to 1, both sps_inter_allowed_flag and pps_inter_allowed_flag described above in subsection 5 ("SPS signaling") have a value of 0. When one_picture_only_constraint_flag is not present or has a value equal to 0, such constraint may not apply to sps_inter_allowed_flag and pps_inter_allowed_flag.

Aspect 10: According to embodiments, only_one_picture_present_flag may be provided in VVC.

Aspect 10.1: In one embodiment, sps_only_one_picture_present_flag is signaled in SPS.

Syntax element sps_only_one_picture_present_flag equal to 1 may specify (e.g. to the decoder) that slice_type shall be equal to I slice and that there is only one picture existing in the bitstream. Syntax element one_picture_only_constraint_flag equal to 0 does not impose such a constraint.

Aspect 11: In addition to Aspect 10, when one_picture_only_constraint_flag is present and equal to 1, non-intra related syntax elements and syntax elements regarding picture order count (POC) value and RPL may not be signalled.

Aspect 11.1: In one embodiment, when one_picture_only_constraint_flag is present and equal to 1, bitstream conformance may require that sps_only_one_picture_present_flag has the same value as one_picture_only_constraint_flag.

7. Example Embodiments

Embodiments of the present disclosure may be used separately or combined in any order. Further, each of the embodiments (e.g. methods, encoders, and decoders) may be implemented by processing circuitry (e.g., one or more processors or one or more integrated circuits). In one example, the one or more processors execute a program that is stored in a non-transitory computer-readable medium. Embodiments of the present disclosure may provide changes to the VVC Draft 9 vA. Aspects of embodiments of the present disclosure are described below.

Aspect 1: Embodiments may have sps_only_one_picture_present_flag signaled in SPS specifying whether there is only one coded picture in the bitstream. When sps_only_one_picture_present_flag is signaled in SPS as described in aspect 10 of the above subsection 6 ("Constraint on syntax element for still picture profiles"), the SPS may be provided as shown below in TABLE 7 and, more particularly, as shown in TABLE 8 (see end of Detailed Description).

TABLE 7

Example SPS syntax

| | Descriptor |
|---|---|
| seq_parameter_set_rbsp( ) { | |
|     sps_seq_parameter_set_id | u(4) |
|     sps_only_one_picture_present_flag | u(1) |
|     ... | |
| } | |

The following descriptions of Aspect 1 and other aspects of the Example Embodiments of the present disclosure is made with reference to TABLE 8 (see end of Detailed Description).

Syntax element sps_only_one_picture_present_flag equal to 1 may specify that there is only one coded picture in the bitstream. Syntax element sps_only_one_picture_present_flag equal to 0 may specify that there are more than one coded picture in the bitstream, and sh_slice_type shall be equal to 1. When general_one_picture_only_constraint_flag is equal to 1, it may be bitstream conformance that sps_only_one_picture_present_flag is equal to 1.

Aspect 1.1: When sps_only_one_picture_present_flag is equal to 1, VPS related syntax elements may be skipped, and inferred (e.g. by the decoder) as follows.

Syntax element sps_video_parameter_set_id, when greater than 0, may specify the value of vps_video_parameter_set_id for the VPS referred to by the SPS. When sps_only_one_picture_present_flag is equal to 1, sps_video_parameter_set_id is equal to 0.

When sps_video_parameter_set_id is equal to 0, the following may apply:
(1) The SPS does not refer to a VPS, and no VPS is referred to when decoding each CLVS referring to the SPS.
(2) The value of vps_max_layers_minus1 is inferred to be equal to 0.
(3) The value of vps_max_sublayers_minus1 is inferred to be equal to 6.
(4) The CVS shall contain only one layer (i.e., all VCL NAL unit in the CVS shall have the same value of nuh_layer_id).
(5) The value of GeneralLayerIdx[nuh_layer_id] is inferred to be equal to 0.
(6) The value of vps_independent_layer_flag[GeneralLayerIdx[nuh_layer_id] ] is inferred to be equal to 1.

When vps_independent_layer_flag[GeneralLayerIdx[nuh_layer_id] ] is equal to 1, the SPS referred to by a CLVS with a particular nuh_layer_id value nuhLayerId may be required to have nuh_layer_id equal to nuhLayerId.

The value of sps_video_parameter_set_id may be required to be the same in all SPSs that are referred to by CLVSs in a CVS.

sps_max_sublayers_minus1 plus 1 may specify the maximum number of temporal sublayers that may be present in each CLVS referring to the SPS. The value of sps_max_sublayers_minus1 may be required to be in the range of 0 to vps_max_sublayers_minus1, inclusive. When sps_only_one_picture_present_flag is equal to 1, sps_max_sublayers_minus1 is equal to 0.

Aspect 1.2: When sps_only_one_picture_present_flag is equal to 1, a profile_tier_level( ) syntax structure and a dpb_parameters( ) syntax structure may be required to be present in the SPS. Therefore, sps_ptl_dpb_hrd_params_present_flag may be skipped and inferred to be equal to 1.

sps_ptl_dpb_hrd_params_present_flag equal to 1 may specify that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 may specify that none of these four syntax structures are present in the SPS. When sps_only_one_picture_present_flag is equal to 1, sps_ptl_dpb_hrd_params_present_flag is equal to 1.

When sps_video_parameter_set_id is greater than 0 and there is an OLS that contains only one layer with nuh_layer_id equal to the nuh_layer_id of the SPS, or when sps_video_parameter_set_id is equal to 0, the value of sps_ptl_dpb_hrd_params_present_flag may be required to be equal to 1.

Aspect 1.3: When sps_only_one_picture_present_flag is equal to 1, only one coded picture exists in the bitstream, thus picture order count related syntax elements may not be needed. Therefore, those syntax elements related to POC may be skipped and inferred.

Syntax element sps_log2_max_pic_order_cnt_lsb_minus4 may specify the value of the variable MaxPicOrderCntLsb that is used in the decoding process for picture order count as follows:

$$MaxPicOrderCntLsb = 2^{(sps\_log2\_max\_pic\_order\_cnt\_lsb\_minus4+4)}$$

The value of sps_log2_max_pic_order_cnt_lsb_minus4 may be required to be in the range of 0 to 12, inclusive. When sps_only_one_picture_present_flag is equal to 1, sps_log2_max_pic_order_cnt_lsb_minus4 is equal to 0.

sps_poc_msb_cycle_flag equal to 1 may specify that the ph_poc_msb_cycle_present_flag syntax element is present in PHs referring to the SPS. Syntax element sps_poc_msb_cycle_flag equal to 0 may specify that the ph_poc_msb_cycle_present_flag syntax element is not present in PHs referring to the SPS. When sps_only_one_picture_present_flag is equal to 1, sps_poc_msb_cyle_flag is equal to 0.

Aspect 1.4: When sps_only_one_picture_present_flag is equal to 1, only one coded picture exists in the bitstream and that picture has only slice types equal to I slice. Therefore, syntax elements related to inter slice such as sps_log2_diff_min_qt_min_cb_inter_slice and sps_max_mtt_hierarchy_depth_inter_slice may be skipped and inferred.

Aspect 1.5: When sps_only_one_picture_present_flag is equal to 1, only one coded picture exists in the bitstream and that picture has only slice types equal to I slice. Therefore, syntax elements related to inter coding tool such as sps_weighted_pred_flag, sps_weighted_bipred_flag and etc. may be skipped and inferred as follows.

Syntax element sps_weighted_pred_flag equal to 1 may specify that weighted prediction may be applied to P slices referring to the SPS. Syntax element sps_weighted_pred_flag equal to 0 may specify that weighted prediction is not applied to P slices referring to the SPS. When not present, the value of sps_weighted_pred_flag may be inferred to be equal to 0.

Syntax element sps_weighted_bipred_flag equal to 1 may specify that explicit weighted prediction may be applied to B slices referring to the SPS. Syntax element sps_weighted_bipred_flag equal to 0 may specify that explicit weighted prediction is not applied to B slices referring to the SPS. When not present, the value of sps_weighted_bipred_flag may be inferred to be equal to 0.

Syntax element sps_long_term_ref_pics_flag equal to 0 may specify that no long term reference picture (LTRP) is used for inter prediction of any coded picture in the CLVS. Syntax element sps_long_term_ref_pics_flag equal to 1 may specify that LTRPs may be used for inter prediction of one or more coded pictures in the CLVS. When not present, the value of sps_long_term_ref_pics_flag may be inferred to be equal to 0.

Syntax element sps_idr_rpl_present_flag equal to 1 may specify that reference picture list syntax elements are present in slice headers of IDR pictures. Syntax element sps_idr_rpl_present_flag equal to 0 may specify that reference picture list syntax elements are not present in slice headers of IDR pictures. When not present, the value of sps_idr_rpl_present_flag may be inferred to be equal to 0.

Syntax element sps_rpl1_same_as_rpl0_flag equal to 1 may specify that the syntax element sps_num_ref_pic_lists[1] and the syntax structure ref_pic_list_struct(1, rplsIdx) are not present and the following may apply:

(1) The value of sps_num_ref_pic_lists[1] is inferred to be equal to the value of sps_num_ref_pic_lists[0].
(2) The value of each of syntax elements in ref_pic_list_struct(1, rplsIdx) is inferred to be equal to the value of corresponding syntax element in ref_pic_list_struct(0, rplsIdx) for rplsIdx ranging from 0 to sps_num_ref_pic_lists[0]−1.

When sps_rpl1_same_as_rpl0_flag is not present, the value of sps_rpl1_same_as_rpl0_flag may be inferred to be equal to 0.

Syntax element sps_num_ref_pic_lists[i] may specify the number of the ref_pic_list_struct(listIdx, rplsIdx) syntax structures with listIdx equal to i included in the SPS. The value of sps_num_ref_pic_lists[i] may be required to be in the range of 0 to 64, inclusive. When not present, the value of sps_num_ref_pic_lists[i] may be inferred to be equal to 0.

According to embodiments, for each value of listIdx (equal to 0 or 1), the decoder may allocate memory for a total number of sps_num_ref_pic_lists[i]+1 ref_pic_list_struct(listIdx, rplsIdx) syntax structures since there may be one ref_pic_list_struct(listIdx, rplsIdx) syntax structure directly signalled in the slice headers of a current picture.

Syntax element sps_ref_wraparound_enabled_flag equal to 1 may specify that horizontal wrap-around motion compensation is enabled and may be applied in inter prediction when decoding pictures in the CLVS. Syntax element sps_ref_wraparound_enabled_flag equal to 0 may specify that horizontal wrap-around motion compensation is disabled and not applied in inter prediction when decoding pictures in the CLVS. When not present, the value of sps_ref_wraparound_enabled_flag may be inferred to be equal to 0.

It may be a requirement of bitstream conformance that, when there is one or more values of i in the range of 0 to sps_num_subpics_minus1, inclusive, for which sps_subpic_treated_as_pic_flag[i] is equal to 1 and sps_subpic_width_minus1[i] plus 1 is not equal to (sps_pic_width_max_in_luma_samples+CtbSizeY−1)>>CtbLog 2SizeY), the value of sps_ref_wraparound_enabled_flag shall be equal to 0.

Syntax element sps_temporal_mvp_enabled_flag equal to 1 may specify that temporal motion vector predictors are enabled and may be used in decoding of pictures in the CLVS. Syntax element sps_temporal_mvp_enabled_flag equal to 0 may specify that temporal motion vector predictors are disabled and not used in decoding of pictures in the CLVS. When not present, the value of sps_temporal_mvp_enabled_flag may be inferred to be equal to 0.

Syntax element sps_amvr_enabled_flag equal to 1 may specify that adaptive motion vector difference resolution is enabled and may be used in motion vector coding in decoding of pictures in the CVLS. Syntax element amvr_enabled_flag equal to 0 may specify that adaptive motion vector difference resolution is disabled and not used in motion vector coding in decoding of pictures in the CLVS. When not present, the value of sps_amvr_enabled_flag may be inferred to be equal to 0.

Syntax element sps_bdof_enabled_flag equal to 0 may specify that the bi-directional optical flow inter prediction is disabled and not used in decoding of pictures in the CLVS. Syntax element sps_bdof_enabled_flag equal to 1 may specify that the bi-directional optical flow inter prediction is enabled and may be used in decoding of pictures in the CLVS. When not present, the value of sps_bdof_enabled_flag may be inferred to be equal to 0.

Syntax element sps_smvd_enabled_flag equal to 1 may specify that symmetric motion vector difference is enabled may be used in motion vector decoding in decoding of pictures in the CLVS. Syntax element sps_smvd_enabled_flag equal to 0 may specify that symmetric motion vector difference is disabled and not used in motion vector coding in decoding of pictures in the CLVS. When not present, the value of sps_smvd_enabled_flag may be inferred to be equal to 0.

Syntax element sps_dmvr_enabled_flag equal to 1 may specify that decoder motion vector refinement based inter bi-prediction is enabled and may be used in decoding of pictures in the CLVS. Syntax element sps_dmvr_enabled_flag equal to 0 may specify that decoder motion vector refinement based inter bi-prediction is disabled and not used in decoding of pictures in the CLVS. When not present, the value of sps_dmvr_enabled_flag may be inferred to be equal to 0.

Syntax element sps_mmvd_enabled_flag equal to 1 may specify that merge mode with motion vector difference is enabled and may be used in decoding of pictures in the CLVS. Syntax element sps_mmvd_enabled_flag equal to 0 may specify that merge mode with motion vector difference is disabled and not used in in decoding of pictures in the CLVS. When not present, the value of sps_mmvd_enabled_flag may be inferred to be equal to 0.

Syntax element sps_six_minus_max_num_merge_cand may specify the maximum number of merging motion vector prediction (MVP) candidates supported in the SPS subtracted from 6. The value of sps_six_minus_max_num_merge_cand may be required to be in the range of 0 to 5, inclusive. When not present, the value of sps_six_minus_max_num_merge_cand may be inferred to be equal to 6.

The maximum number of merging MVP candidates, MaxNumMergeCand, may be derived as follows:

MaxNumMergeCand=6−sps_six_minus_max_num_merge_cand

Syntax element sps_sbt_enabled_flag equal to 0 may specify that subblock transform for inter-predicted CUs is disabled and not used in decoding of pictures in the CLVS. Syntax element sps_sbt_enabled_flag equal to 1 may specify that subblock transform for inter-predicteds CU is enabled and may be used in decoding of pictures in the CLVS. When not present, the value of sps_sbt_enabled_flag is inferred to be equal to 0.

Syntax element sps_affine_enabled_flag equal to 0 may specify that affine model based motion compensation is disabled and not used in decoding of pictures in the CLVS, and inter_affine_flag and cu_affine_type_flag are not present in the coding unit syntax of the CLVS. Syntax element sps_affine_enabled_flag equal to 1 may specify that affine model based motion compensation is enabled and may be used in decoding of pictures in the CLVS, and inter_affine_flag and cu_affine_type_flag may be present in the coding unit syntax of the CLVS. When not present, the value of sps_affine_enabled_flag may be inferred to be equal to 0.

Syntax element sps_five_minus_max_num_subblock_merge_cand may specify the maximum number of subblock-based merging motion vector prediction candidates supported in the SPS subtracted from 5. The value of sps_five_minus_max_num_subblock_merge_cand may be required to be in the range of 0 to 5−sps_sbtmvp_enabled_flag, inclusive. When not present, the value of sps_five_minus_max_num_subblock_merge_cand may be inferred to be equal to 5−sps_sbtmvp_enabled_flag.

Syntax element sps_bcw_enabled_flag equal to 0 may specify that bi-prediction with CU weights is disabled and not used in decoding of pictures in the CLVS, and bcw_idx is not present in the coding unit syntax of the CLVS. Syntax element sps_bcw_enabled_flag equal to 1 may specify that bi-prediction with CU weights is enabled and may be used in decoding of pictures in the CLVS, and bcw_idx may be present in the coding unit syntax of the CLVS. When not present, the value of sps_bcw_enabled_flag may be inferred to be equal to 0.

Syntax element sps_ciip_enabled_flag may specify that ciip_flag may be present in the coding unit syntax for inter coding units. Syntax element sps_ciip_enabled_flag equal to 0 may specify that ciip_flag is not present in the coding unit syntax for inter coding units. When not present, the value of sps_ciip_enabled_flag may be inferred to be equal to 0.

Syntax element sps_log2_parallel_merge_level_minus2 plus 2 may specify the value of the variable Log 2ParMrgLevel, which is used in the derivation process for spatial merging candidates, the derivation process for motion vectors and reference indices in subblock merge mode, and to control the invocation of the updating process for the history-based motion vector predictor list. When not present, the value of sps_log2_parallel_merge_level_minus2 may be inferred to be equal to 0. The value of sps_log2_parallel_merge_level_minus2 may be required to be in the range of 0 to CtbLog 2SizeY−2, inclusive. The variable Log 2ParMrgLevel may be derived as follows:

Log 2ParMrgLevel=sps_log 2_parallel_merge_level_minus2+2

Aspect 2: When general_one_picture_only_constraint_flag in general_constraint_info( ) is equal to 1, the value of intra_only_constraint_flag may be required to be equal to 1. When intra_only_constraint_flag is equal to 1, slice types are I slices. Therefore, syntax elements related inter coding tool may not be needed. Embodiments may constrain syntax elements in general_constraint_info( ) as follows.

Syntax element no_sbtmvp_constraint_flag equal to 1 may specify that sps_sbtmvp_enabled_flag shall be equal to 0. Syntax element no_sbtmvp_constraint_flag equal to 0 may not impose such a constraint. When no_temporal_mvp_constraint_flag is equal to 1, the value of no_sbtmvp_constraint_flag may be required to be equal to 1. When intra_only_constraint_flag is equal to 1, the value of no_sbtmvp_constraint_flag may be required to be equal to 1.

Syntax element no_sbt_constraint_flag equal to 1 may specify that sps_sbt_enabled_flag shall be equal to 0. Syntax element no_sbt_constraint_flag equal to 0 may not impose such a constraint. When intra_only_constraint_flag is equal to 1, the value of no_sbt_constraint_flag may be required to be equal to 1.

Aspect 3: In addition to Aspect 1, syntax elements in PH may be constrained based on the value of sps_only_one_picture_present_flag. For example, an example PH according to embodiments of the present disclosure is shown in TABLE 9 (see end of detailed Description).

Aspect 3.1: Referring to TABLE 9, when sps_only_one_picture_present_flag is equal to 1, there is only one coded picture existing in the bitstream and all coded slices of the picture have slice type equal to I slice. Therefore, syntax elements that indicate possible slice types exist in the picture, such as ph_inter_slice_allowed_flag and ph_intra_slice_allowed_flag, may be skipped when sps_only_one_picture_present_flag is equal to 1.

Syntax element ph_inter_slice_allowed_flag equal to 0 may specify that all coded slices of the picture have sh_slice_type equal to 2. Syntax element ph_inter_slice_allowed_flag equal to 1 may specify that there may or may not be one or more coded slices in the picture that have sh_slice_type equal to 0 or 1. When not present, the value of ph_inter_slice_allowed_flag may be inferred to be equal to 0.

Aspect 3.2: Referring to TABLE 9, when sps_only_one_picture_present_flag is equal to 1, there is only one coded picture existing in the bitstream and all coded slices of the picture have slice type equal to I slice. Therefore, syntax elements related to reference picture such as ph_non_ref_pic_flag and reference picture lists structure ref_pic_lists( ) may be skipped when sps_only_one_picture_present_flag is equal to 1.

Syntax element ph_non_ref_pic_flag equal to 1 may specify the picture associated with the PH is never used as a reference picture. Syntax element ph_non_ref_pic_flag equal to 0 may specify the picture associated with the PH may or may not be used as a reference picture. When not present, the value of ph_non_ref_pic_flag may be inferred to be equal to 0.

Aspect 3.3: Referring to TABLE 9, when sps_only_one_picture_present_flag is equal to 1, there is only one coded picture existing in the bitstream and all coded slices of the picture have slice type equal to I slice. Therefore, syntax elements related to picture order count (POC) and decoded picture buffer (DPB) such as ph_pic_order_cnt_lsb and ph_recovery_poc_cnt may be skipped when sps_only_one_picture_present_flag is equal to 1.

Syntax element ph_pic_order_cnt_lsb may specify the picture order count modulo MaxPicOrderCntLsb for the current picture. The length of the ph_pic_order_cnt_lsb syntax element may be sps_log2_max_pic_order_cnt_lsb_minus4+4 bits. The value of the ph_pic_order_cnt_lsb may be required to be in the range of 0 to MaxPicOrderCntLsb−1, inclusive. When not present, the value of ph_pic_order_cnt_lsb may be inferred to be equal to 0.

Syntax element ph_no_output_of_prior_pics_flag may affect the output of previously-decoded pictures in the DPB after the decoding of a picture in a CVSS AU that is not the first AU in the bitstream.

It may be a requirement of bitstream conformance that, when present, the value of ph_no_output_of_prior_pics_flag shall be the same for all pictures in an AU.

When ph_no_output_of_prior_pics_flag is present in the PHs of the pictures in an AU, the ph_no_output_of_prior_pics_flag value of the AU is the ph_no_output_of_prior- _pics_flag value of the pictures in the AU. When not present, the value of ph_no_output_of_prior_pics_flag may be inferred to be equal to 0.

Syntax element ph_recovery_poc_cnt may specify the recovery point of decoded pictures in output order.

When the current picture is a GDR picture, the variable recoveryPointPocVal may be derived as follows:

recoveryPointPocVal=PicOrderCntVal+ph_recovery_poc_cnt

If the current picture is a GDR picture, and there is a picture picA that follows the current GDR picture in decoding order in the CLVS that has PicOrderCntVal equal to recoveryPointPocVal, the picture picA may be referred to as the recovery point picture. Otherwise, the first picture in output order that has PicOrderCntVal greater than recoveryPointPocVal in the CLVS may be referred to as the recovery point picture. The recovery point picture may be required to not precede the current GDR picture in decoding order. The pictures that are associated with the current GDR picture and have PicOrderCntVal less than recoveryPointPocVal may be referred to as the recovering pictures of the GDR picture. The value of ph_recovery_poc_cnt may be required to be in the range of 0 to MaxPicOrderCntLsb-1, inclusive. When not present, the value of ph_recovery_poc_cnt may be inferred to be equal to 0.

Syntax element ph_poc_msb_cycle_present_flag equal to 1 may specify that the syntax element ph_poc_msb_cycle_val is present in the PH. Syntax element ph_poc_msb_cycle_present_flag equal to 0 may specify that the syntax element ph_poc_msb_cycle_val is not present in the PH. When vps_independent_layer_flag[GeneralLayerIdx[nuh_layer_id] ] is equal to 0 and there is a picture in the current AU in a reference layer of the current layer, the value of ph_poc_msb_cycle_present_flag may be required to be equal to 0. When not present, the value of ph_poc_msb_cycle_present_flag may be inferred to be equal to 0.

[8. Example Computer Code]

Embodiments of the present disclosure may comprise at least one processor and memory storing computer code. The computer code, when executed by the at least one processor, may be configured to cause the at least one processor to perform the functions of the embodiments of the present disclosure.

Figure 5:
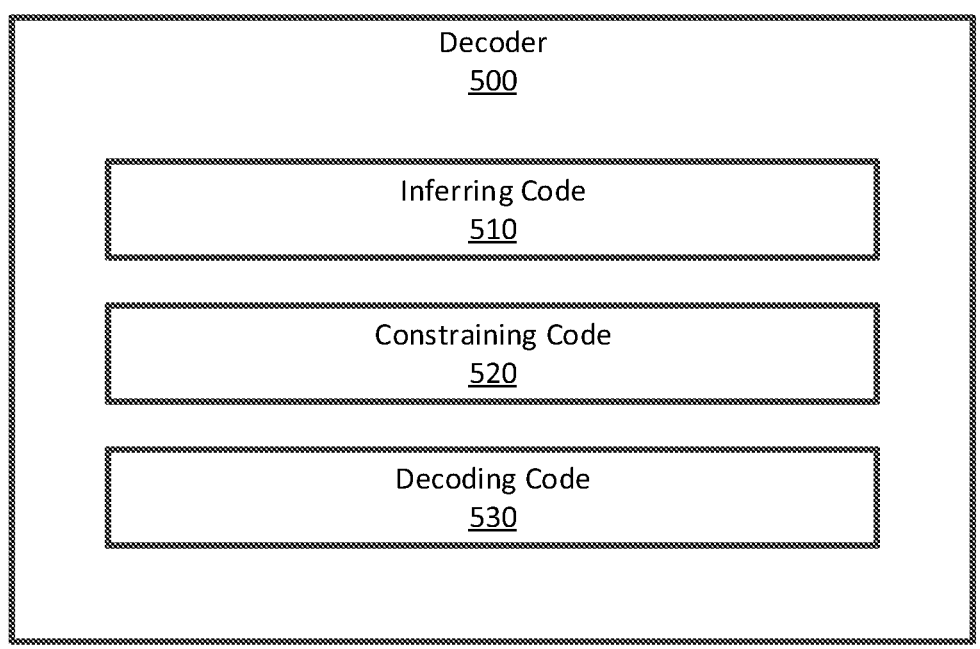
FIG. 5 is a block diagram of computer code according to embodiments.
Figure 6:
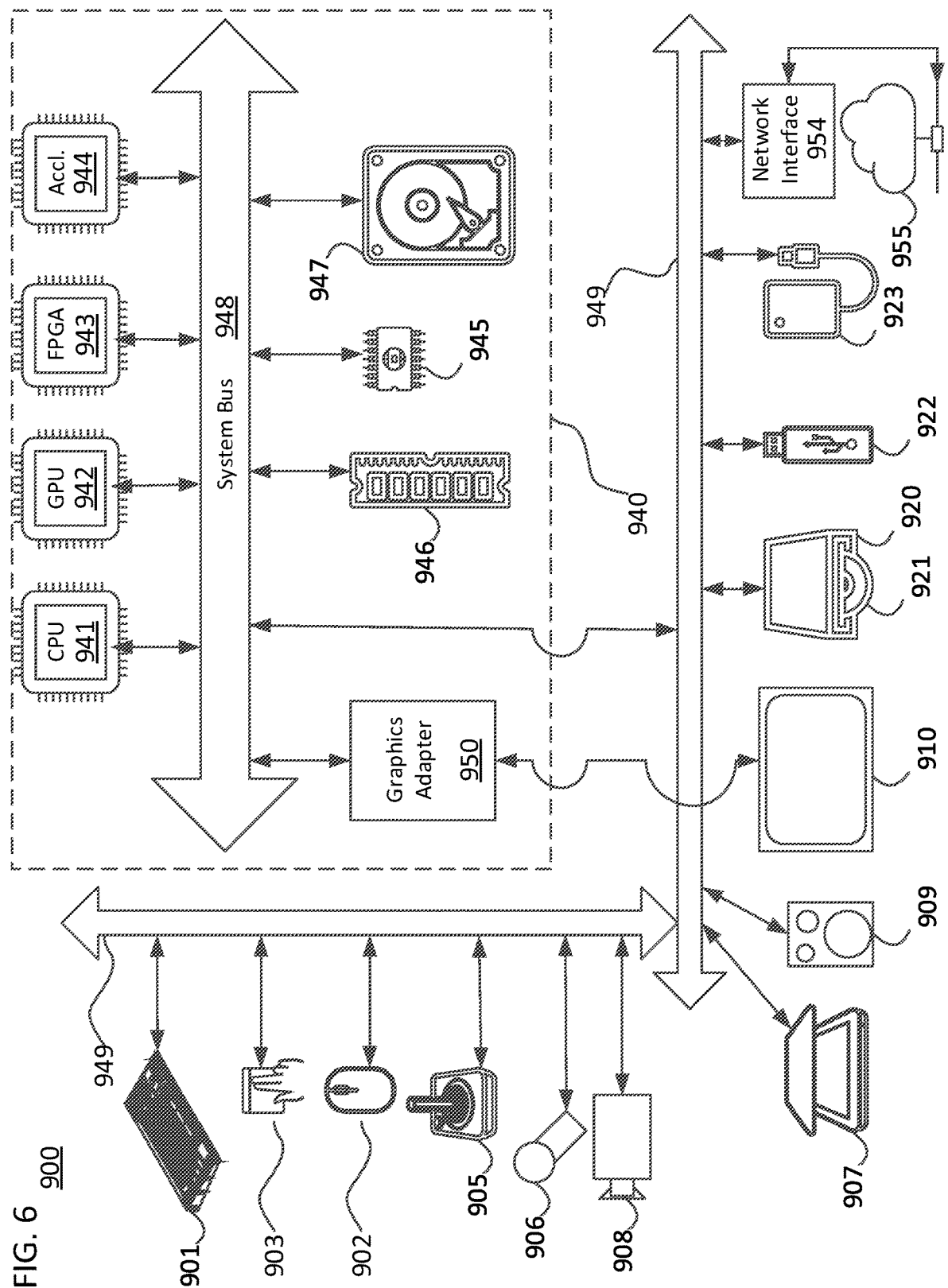
FIG. 6 is a diagram of a computer system suitable for implementing embodiments.

For example, with reference to FIG. 5, a decoder (500) of the present disclosure may comprise at least one processor and memory storing computer code. The computer instructions may comprise inferring code (510), constraining code (520), and decoding code (530). The decoder (500) may implement the video decoder (210) illustrated in FIGS. 2-3. The decoder (500) may be configured to receive a bitstream including at least one coded picture and parameter sets (e.g., SPS and VPS) and headers (e.g. picture headers).

The inferring code (510) may be configured to cause the at least one processor to skip and infer syntax elements in accordance with, for example, one or more of aspects 1-3.3 of subsection 7 ("Example Embodiments") of the present disclosure. For example, the at least one processor may skip and infer syntax elements based on the value of "sps_only_one_picture_present_flag" that is provided in the bitstream.

The constraining code (520) may be configured to cause the at least one processor to constrain syntax elements in accordance with, for example, one or more of aspects 1-3.3 of subsection 7 ("Example Embodiments") of the present disclosure.

The decoding code (530) may be configured to cause the at least one processor to decode the at least one coded picture based on one or more of the inferred syntax elements and the constrained syntax elements of aspects 1-3.3 of subsection 7 ("Example Embodiments") of the present disclosure.

The techniques of embodiments of the present disclosure described above, can be implemented as computer software using computer-readable instructions and physically stored in one or more computer-readable media. For example, FIG. 8 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter 950 may be included in the core 940.

CPUs (941), GPUs (942), FPGAs (943), and accelerators (944) can execute certain instructions that, in combination, can make up the aforementioned computer code. That computer code can be stored in ROM (945) or RAM (946). Transitional data can be also stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

[TABLES]

TABLE 1

Sequence parameter set RBSP syntax

|  | Descriptor |
|---|---|
| seq_parameter_set_rbsp( ) { |  |
|    sps_seq_parameter_set_id | u(4) |
|    sps_video_parameter_set_id | u(4) |
|    sps_max_sublayers_minus1 | u(3) |
|    sps_reserved_zero_4bits | u(4) |
|    sps_ptl_dpb_hrd_params_present_flag | u(1) |

TABLE 1-continued

Sequence parameter set RBSP syntax

| | Descriptor |
|---|---|
| if( sps_ptl_dpb_hrd_params_present_flag ) | |
|   profile_tier_level( 1, sps_max_sublayers_minus1 ) | |
| gdr_enabled_flag | u(1) |
| chroma_format_idc | u(2) |
| if( chroma_format_idc = = 3 ) | |
|   separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
|   sps_conf_win_left_offset | ue(v) |
|   sps_conf_win_right_offset | ue(v) |
|   sps_conf_win_top_offset | ue(v) |
|   sps_conf_win_bottom_offset | ue(v) |
| } | |
| sps_log2_ctu_size_minus5 | u(2) |
| subpic_info_present_flag | u(1) |
| if( subpic_info_present_flag ) { | |
|   sps_num_subpics_minus1 | ue(v) |
|   sps_independent_subpics_flag | u(1) |
|   for( i = 0; sps_num_subpics_minus1 > 0 && i <= sps_num_subpics_minus1; i++ ) { | |
|     if( i > 0 && pic_width_max_in_luma_samples > CtbSizeY ) | |
|       subpic_ctu_top_left_x[ i ] | u(v) |
|     if( i > 0 && pic_height_max_in_luma_samples > CtbSizeY ) { | |
|       subpic_ctu_top_left_y[ i ] | u(v) |
|     if( i < sps_num_subpics_minus1 && | |
|       pic_width_max_in_luma_samples > CtbSizeY ) | |
|       subpic_width_minus1[ i ] | u(v) |
|     if( i < sps_num_subpics_minus1 && | |
|       pic_height_max_in_luma_samples > CtbSizeY ) | |
|       subpic_height_minus1[ i ] | u(v) |
|     if( !sps_independent_subpics_flag) { | |
|       subpic_treated_as_pic_flag[ i ] | u(1) |
|       loop_filter_across_subpic_enabled_flag[ i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i <= sps_num_subpics_minus1; i++ ) | |
|         sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |

TABLE 1-continued

Sequence parameter set RBSP syntax

| | Descriptor |
|---|---|
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc = = 1 ) { | |
|   sps_chroma_horizontal_collocated_flag | u(1) |
|   sps_chroma_vertical_collocated_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |

TABLE 1-continued

Sequence parameter set RBSP syntax

| | Descriptor |
|---|---|
|     five_minus_max_num_subblock_merge_cand | ue(v) |
|     sps_affine_type_flag | u(1) |
|     if( sps_amvr_enabled_flag ) | |
|       sps_affine_amvr_enabled_flag | u(1) |
|     sps_affine_prof_enabled_flag | u(1) |
|     if( sps_affine_prof_enabled_flag ) | |
|       sps_prof_pic_present_flag | u(1) |
|   } | |
|   sps_palette_enabled_flag | |
|   if( ChromaArrayType = = 3 && !sps_max_luma_transform_size_64_flag ) | |
|     sps_act_enabled_flag | u(1) |
|   if( sps_transform_skip_enabled_flag | | sps_palette_enabled_flag ) | ue(v) |
|     min_qp_prime_ts_minus4 | |
|   sps_bcw_enabled_flag | u(1) |
|   sps_ibc_enabled_flag | u(1) |
|   if( sps_ibc_enabled_flag ) | |
|     six_minus_max_num_ibc_merge_cand | ue(v) |
|   sps_ciip_enabled_flag | u(1) |
|   if( sps_mmvd_enabled_flag ) | |
|     sps_fpel_mmvd_enabled_flag | u(1) |
|   if( MaxNumMergeCand >= 2 ) { | |
|     sps_gpm_enabled_flag | u(1) |
|     if( sps_gpm_enabled_flag && MaxNumMergeCand >= 3 ) | |
|       max_num_merge_cand_minus_max_num_gpm_cand | ue(v) |
|   } | |
|   sps_lmcs_enabled_flag | u(1) |
|   sps_lfnst_enabled_flag | u(1) |
|   sps_ladf_enabled_flag | u(1) |
|   if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   log2_parallel_merge_level_minus2 | ue(v) |
|   sps_explicit_scaling_list_enabled_flag | u(1) |
|   sps_dep_quant_enabled_flag | u(1) |
|   if( !sps_dep_quant_enabled_flag ) | |
|     sps_sign_data_hiding_enabled_flag | u(1) |
|   sps_virtual_boundaries_enabled_flag | u(1) |
|   if( sps_virtual_boundaries_enabled_flag ) { | |
|     sps_virtual_boundaries_present_flag | u(1) |
|     if( sps_virtual_boundaries_present_flag ) { | |
|       sps_num_ver_virtual_boundaries | u(2) |
|       for( i = 0; i < sps_num_ver_virtual_boundaries; i++ ) | |
|         sps_virtual_boundaries_pos_x[ i ] | u(13) |
|       sps_num_hor_virtual_boundaries | u(2) |
|       for( i = 0; i < sps_num_hor_virtual_boundaries; i++ ) | |
|         sps_virtual_boundaries_pos_y[ i ] | u(13) |
|     } | |
|   } | |
|   if( sps_ptl_dpb_hrd_params_present_flag ) { | |
|     sps_general_hrd_params_present_flag | u(1) |
|     if( sps_general_hrd_params_present_flag ) { | |
|       general_hrd_parameters( ) | |
|       if( sps_max_sublayers_minus1 > 0 ) | |
|         sps_sublayer_cpb_params_present_flag | u(1) |
|       firstSubLayer = sps_sublayer_cpb_params_present_flag ? 0 : | |
|         sps_max_sublayers_minus1 | |
|       ols_hrd_parameters( firstSubLayer, sps_max_sublayers_minus1 ) | |
|     } | |
|   } | |
|   field_seq_flag | u(1) |
|   vui_parameters_present_flag | u(1) |
|   if( vui_parameters_present_flag ) | |
|     vui_parameters( ) /* Specified in ITU-T H.SEI | ISO/IEC 23002-7 */ | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

Table 3: General Constraint Information

TABLE 3

| General constraint information | Descriptor |
|---|---|
| general_constraint_info( ) { | |
|   general_non_packed_constraint_flag | u(1) |
|   general_frame_only_constraint_flag | u(1) |
|   general_non_projected_constraint_flag | u(1) |
|   general_one_picture_only_constraint_flag | u(1) |
|   intra_only_constraint_flag | u(1) |
|   max_bitdepth_constraint_idc | u(4) |
|   max_chroma_format_constraint_idc | u(2) |
|   single_layer_constraint_flag | u(1) |
|   all_layers_independent_constraint_flag | u(1) |
|   no_ref_pic_resampling_constraint_flag | u(1) |
|   no_res_change_in_clvs_constraint_flag | u(1) |
|   one_tile_per_pic_constraint_flag | u(1) |
|   pic_header_in_slice_header_constraint_flag | u(1) |
|   one_slice_per_pic_constraint_flag | u(1) |
|   one_subpic_per_pic_constraint_flag | u(1) |
|   no_qtbtt_dual_tree_intra_constraint_flag | u(1) |
|   no_partition_constraints_override_constraint_flag | u(1) |
|   no_sao_constraint_flag | u(1) |
|   no_alf_constraint_flag | u(1) |
|   no_ccalf_constraint_flag | u(1) |
|   no_joint_cbcr_constraint_flag | u(1) |
|   no_mrl_constraint_flag | u(1) |
|   no_isp_constraint_flag | u(1) |
|   no_mip_constraint_flag | u(1) |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   no_dmvr_constraint_flag | u(1) |
|   no_cclm_constraint_flag | u(1) |
|   no_mts_constraint_flag | u(1) |
|   no_sbt_constraint_flag | u(1) |

TABLE 3-continued

| General constraint information | Descriptor |
|---|---|
|   no_lfnst_constraint_flag | u(1) |
|   no_affine_motion_constraint_flag | u(1) |
|   no_mmvd_constraint_flag | u(1) |
|   no_smvd_constraint_flag | u(1) |
|   no_prof_constraint_flag | u(1) |
|   no_bcw_constraint_flag | u(1) |
|   no_ibc_constraint_flag | u(1) |
|   no_ciip_constraint_flag | u(1) |
|   no_gpm_constraint_flag | u(1) |
|   no_ladf_constraint_flag | u(1) |
|   no_transform_skip_constraint_flag | u(1) |
|   no_bdpcm_constraint_flag | u(1) |
|   no_palette_constraint_flag | u(1) |
|   no_act_constraint_flag | u(1) |
|   no_lmcs_constraint_flag | u(1) |
|   no_cu_qp_delta_constraint_flag | u(1) |
|   no_chroma_qp_offset_constraint_flag | u(1) |
|   no_dep_quant_constraint_flag | u(1) |
|   no_sign_data_hiding_constraint_flag | u(1) |
|   no_tsrc_constraint_flag | u(1) |
|   no_mixed_nalu_types_in_pic_constraint_flag | u(1) |
|   no_trail_constraint_flag | u(1) |
|   no_stsa_constraint_flag | u(1) |
|   no_rasl_constraint_flag | u(1) |
|   no_radl_constraint_flag | u(1) |
|   no_idr_constraint_flag | u(1) |
|   no_cra_constraint_flag | u(1) |
|   no_gdr_constraint_flag | u(1) |
|   no_aps_constraint_flag | u(1) |
|   while( !byte_aligned( ) ) | |
|     gci_alignment_zero_bit | f(1) |
|   gci_num_reserved_bytes | u(8) |
|   for( i = 0; i < gci_num_reserved_bytes; i++ ) | |
|     gci_reserved_byte[ i ] | u(8) |
| } | |

TABLE 4

| Picture header structure | Descriptor |
|---|---|
| picture_header_structure( ) { | |
|   ph_gdr_or_irap_pic_flag | u(1) |
|   if( ph_gdr_or_irap_pic_flag ) | |
|     ph_gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   ph_non_ref_pic_flag | u(1) |
|   ph_pic_parameter_set_id | ue(v) |
|   ph_pic_order_cnt_lsb | u(v) |
|   if( ph_gdr_or_irap_pic_flag ) | |
|     ph_no_output_of_prior_pics_flag | u(1) |
|   if( ph_gdr_pic_flag ) | |
|     ph_recovery_poc_cnt | ue(v) |
|   for( i = 0; i < NumExtraPhBits; i++ ) | |
|     ph_extra_bit[ i ] | u(1) |
|   if( sps_poc_msb_cycle_flag ) { | |
|     ph_poc_msb_cycle_present_flag | u(1) |
|     if( ph_poc_msb_cycle_present_flag ) | |
|       ph_poc_msb_cycle_val | u(v) |
|   } | |
|   if( sps_alf_enabled_flag && pps_alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) { | |

TABLE 4-continued

Picture header structure

| | Descriptor |
|---|---|
|     ph_alf_cb_flag | u(1) |
|     ph_alf_cr_flag | u(1) |
|   } | |
|   if( ph_alf_cb_flag \|\| ph_alf_cr_flag ) | |
|     ph_alf_aps_id_chroma | u(3) |
|   if( sps_ccalf_enabled_flag ) { | |
|     ph_cc_alf_cb_enabled_flag | u(1) |
|     if( ph_cc_alf_cb_enabled_flag ) | |
|       ph_cc_alf_cb_aps_id | u(3) |
|     ph_cc_alf_cr_enabled_flag | u(1) |
|     if( ph_cc_alf_cr_enabled_flag ) | |
|       ph_cc_alf_cr_aps_id | u(3) |
|     } | |
|   } | |
| } | |
| if( sps_lmcs_enabled_flag ) { | |
|   ph_lmcs_enabled_flag | u(1) |
|   if( ph_lmcs_enabled_flag ) { | |
|     ph_lmcs_aps_id | u(2) |
|     if( ChromaArrayType != 0 ) | |
|       ph_chroma_residual_scale_flag | u(1) |
|   } | |
| } | |
| if( sps_explicit_scaling_list_enabled_flag ) { | |
|   ph_explicit_scaling_list_enabled_flag | u(1) |
|   if( ph_explicit_scaling_list_enabled_flag ) | |
|     ph_scaling_list_aps_id | u(3) |
| } | |
| if( sps_virtual_boundaries_enabled_flag && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundary_pos_x[ i ] | ue(v) |
|     ph_num_hor_virtual_boundaries | u(2) |
|     for( i = 0; i < ph_num_hor_virtual_boundaries; i++ ) | |
|       ph_virtual_boundary_pos_y[ i ] | ue(v) |
|   } | |
| } | |
| if( pps_output_flag_present_flag && !ph_non_ref_pic_flag ) | |
|   ph_pic_output_flag | u(1) |
| if( pps_rpl_info_in_ph_flag ) | |
|   ref_pic_lists( ) | |
| if( sps_partition_constraints_override_enabled_flag ) | |
|   ph_partition_constraints_override_flag | u(1) |
| if( ph_intra_slice_allowed_flag ) { | |
|   if( ph_partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( sps_qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( pps_cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( ph_partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |

TABLE 4-continued

Picture header structure

| | Descriptor |
|---|---|
| ph_log2_diff_max_bt_min_qt_inter_slice | ue(v) |
| ph_log2_diff_max_tt_min_qt_inter_slice | ue(v) |
|   } | |
| } | |
| if( pps_cu_qp_delta_enabled_flag ) | |
|   ph_cu_qp_delta_subdiv_inter_slice | ue(v) |
| if( pps_cu_chroma_qp_offset_list_enabled_flag ) | |
|   ph_cu_chroma_qp_offset_subdiv_inter_slice | ue(v) |
| if( sps_temporal_mvp_enabled_flag ) { | |
|   ph_temporal_mvp_enabled_flag | u(1) |
|   if( ph_temporal_mvp_enabled_flag && pps_rpl_info_in_ph_flag ) { | |
|     if( num_ref_entries[ 1 ][ RplsIdx[ 1 ] ] > 0 ) | |
|       ph_collocated_from_l0_flag | u(1) |
|     if( ( ph_collocated_from_l0_flag && | |
|       num_ref_entries[ 0 ][ RplsIdx[ 0 ] ] > 1 ) \|\| | |
|       ( !ph_collocated_from_l0_flag && | |
|       num_ref_entries[ 1 ][ RplsIdx[ 1 ] ] > 1 ) ) | |
|       ph_collocated_ref_idx | ue(v) |
|   } | |
| } | |
| if( sps_mmvd_fullpel_only_flag ) | |
|   ph_mmvd_fullpel_only_flag | u(1) |
| if( !pps_rpl_info_in_ph_flag \|\| num_ref_entries[ 1 ][ RplsIdx[ 1 ] ] > 0 ) { | |
|   ph_mvd_l1_zero_flag | u(1) |
|   if( sps_bdof_control_present_in_ph_flag ) | |
|     ph_bdof_disabled_flag | u(1) |
|   if( sps_dmvr_control_present_in_ph_flag ) | |
|     ph_dmvr_disabled_flag | u(1) |
| } | |
| if( sps_prof_control_present_in_ph_flag ) | |
|   ph_prof_disabled_flag | u(1) |
| if( ( pps_weighted_pred_flag \|\| pps_weighted_bipred_flag ) && | |
|   pps_wp_info_in_ph_flag ) | |
|   pred_weight_table( ) | |
| } | |
| if( pps_qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && pps_sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( pps_deblocking_filter_override_enabled_flag && pps_dbf_info_in_ph_flag ) { | |
|   ph_deblocking_filter_override_flag | u(1) |
|   if( ph_deblocking_filter_override_flag ) { | |
|     if( !pps_deblocking_filter_disabled_flag ) | |
|       ph_deblocking_filter_disabled_flag | u(1) |
|     if( !ph_deblocking_filter_disabled_flag ) { | |
|       ph_luma_beta_offset_div2 | se(v) |
|       ph_luma_tc_offset_div2 | se(v) |
|       if( pps_chroma_tool_offsets_present_flag ) { | |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } | |
|     } | |
|   } | |
| } | |
| if( pps_picture_header_extension_present_flag ) { | |
|   ph_extension_length | ue(v) |
|   for( i = 0; i < ph_extension_length; i++) | |
|     ph_extension_data_byte[ i ] | u(8) |
| } | |
| } | |

TABLE 8

| Example SPS syntax | |
|---|---|
| | Descriptor |
| seq_param eter_set_rbsp( ) { | |
|   sps_seq_parameter_set_id | u(4) |
|   sps_only_one_picture_present_flag | u(1) |
|   if (!sps_only_one_picture_present_flag) { | |
|     sps_video_parameter_set_id | u(4) |
|     sps_max_sublayers_minus_1 | u(3) |
|   } | |
|   sps_reserved_zero_4bits | u(4) |
|   if (!sps_only_one_picture_present_flag) | |
|     sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   sps_gdr_enabled_flag | u(1) |
|   sps_chroma_format_idc | u(2) |
|   if( sps_chroma_format_idc = = 3 ) | |
|     sps_separate_colour_plane_flag | u(1) |
|   sps_ref_pic_resampling_enabled_flag | u(1) |
|   if( sps_ref_pic_resampling_enabled_flag ) | |
|     sps_res_change_in_clvs_allowed_flag | u(1) |
|   sps_pic_width_max_in_luma_samples | ue(v) |
|   sps_pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   sps_subpic_info_present_flag | u(1) |
|   if( sps_subpic_info_present_flag ) { | |
|     sps_num_subpics_minus1 | ue(v) |
|     if( sps_num_subpics_minus1 > 0 ) | |
|       sps_independent_subpics_flag | u(1) |
|     for( i = 0; sps_num_subpics_minus1 > 0 && i <= sps_num_subpics_minus1; i++ ) { | |
|       if( i > 0 && sps_pic_width_max_in_luma_samples > CtbSizeY ) | |
|         sps_subpic_ctu_top_left_x[ i ] | u(v) |
|       if( i > 0 && sps_pic_height_max_in_luma_samples > CtbSizeY ) { | |
|         sps_subpic_ctu_top_left_y[ i ] | u(v) |
|       if( i < sps_num_subpics_minus1 && | |
|         sps_pic_width_max_in_luma_samples > CtbSizeY ) | |
|         sps_subpic_width_minus1[ i ] | u(v) |
|       if( i < sps_num_subpics_minus1 && | |
|         sps_pic_height_max_in_luma_samples > CtbSizeY ) | |
|         sps_subpic_height_minus1[ i ] | u(v) |
|       if( !sps_independent_subpics_flag) { | |
|         sps_subpic_treated_as_pic_flag[ i ] | u(1) |
|         sps_loop_filter_across_subpic_enabled_flag[ i ] | u(1) |
|       } | |
|     } | |
|     sps_subpic_id_len_minus1 | ue(v) |
|     sps_subpic_id_mapping_explicitly_signalled_flag | u(1) |
|     if( sps_subpic_id_mapping_explicitly_signalled_flag ) { | |
|       sps_subpic_id_mapping_present_flag | u(1) |
|       if( sps_subpic_id_mapping_present_flag ) | |
|         for( i = 0; i <= sps_num_subpics_minus1; i++ ) | |
|           sps_subpic_id[ i ] | u(v) |
|     } | |
|   } | |
|   sps_bit_depth_minus8 | ue(v) |
|   sps_entropy_coding_sync_enabled_flag | u(1) |
|   sps_entry_point_offsets_present_flag | u(1) |
|   if (!sps_only_one_picture_present_flag) { | |
|     sps_log2_max_pic_order_cnt_lsb_minus4 | u(4) |
|     sps_poc_msb_cycle_flag | u(1) |
|   } | |
|   if( sps_poc_msb_cycle_flag ) | |
|     sps_poc_msb_cycle_len_minus1 | ue(v) |
|   sps_num_extra_ph_bits_bytes | u(2) |
|   extra_ph_bits_struct( sps_num_extra_ph_bits_bytes ) | |
|   sps_num_extra_sh_bits_bytes | u(2) |
|   extra_sh_bits_struct( sps_num_extra_sh_bits_bytes ) | |
|   if( sps_ptl_dpb_hrd_params_present_flag ) { | |
|     if( sps_max_sublayers_minus1 > 0 ) | |

TABLE 8-continued

Example SPS syntax

| | Descriptor |
|---|---|
|     sps_sublayer_dpb_params_flag | u(1) |
|   dpb_parameters( sps_max_sublayers_minus1, sps_sublayer_dpb_params_flag ) | |
| } | |
| if( ChromaArrayType != 0 ) | |
|   sps_qtbtt_dual_tree_intra_flag | u(1) |
| sps_log2_min_luma_coding_block_size_minus2 | ue(v) |
| sps_partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if (!sps_only_one_picture_present_flag) { | |
|   sps_log2_diff_min_qt_min_cb_inter_slice | ue(v) |
|   sps_max_mtt_hierarchy_depth_inter_slice | ue(v) |
| } | |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( sps_qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| if( CtbSizeY > 32 ) | |
|   sps_max_luma_transform_size_64_flag | u(1) |
| if( ChromaArrayType != 0 ) { | |
|   sps_joint_cbcr_enabled_flag | u(1) |
|   sps_same_qp_table_for_chroma_flag | u(1) |
|   numQpTables = sps_same_qp_table_for_chroma_flag ? 1 : | |
|     ( sps_joint_cbcr_enabled_flag ? 3 : 2 ) | |
|   for( i = 0; i < numQpTables; i++ ) { | |
|     sps_qp_table_start_minus26[ i ] | se(v) |
|     sps_num_points_in_qp_table_minus1[ i ] | ue(v) |
|     for( j = 0; j <= sps_num_points_in_qp_table_minus1[ i ]; j++ ) { | |
|       sps_delta_qp_in_val_minusl[ i ][ j ] | ue(v) |
|       sps_delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   sps_log2_transform_skip_max_size_minus2 | ue(v) |
|   sps_bdpcm_enabled_flag | u(1) |
| } | |
| if (!sps_only_one_picture_present_flag) { | |
|   sps_weighted_pred_flag | u(1) |
|   sps_weighted_bipred_flag | u(1) |
|   sps_long_term_ref_pics_flag | u(1) |
|   if( sps_video_parameter_set_id > 0 ) | |
|     sps_inter_layer_ref_pics_present_flag | u(1) |
|   sps_idr_rpl_present_flag | u(1) |
|   sps_rpl1_same_as_rpl0_flag | u(1) |
|   for( i = 0; i < sps_rpl1_same_as_rpl0_flag ? 1 : 2; i++ ) { | |
|     sps_num_ref_pic_lists[ i ] | ue(v) |
|     for( j = 0; j < sps_num_ref_pic_lists[ i ]; j++) | |
|       ref_pic_list_struct( i, j ) | |
|   } | |
|   sps_ref_wraparound_enabled_flag | u(1) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   if( sps_bdof_enabled_flag ) | |
|     sps_bdof_control_present_in_ph_flag | u(1) |
|   sps_smvd_enabled_flag | u(1) |

TABLE 8-continued

Example SPS syntax

| | Descriptor |
|---|---|
| sps_dmvr_enabled_flag | u(1) |
| if( sps_dmvr_enabled_flag ) | |
|    sps_dmvr_control_present_in_ph_flag | u(1) |
| sps_mmvd_enabled_flag | u(1) |
| if( sps_mmvd_enabled_flag ) | |
|    sps_mmvd_fullpel_only_flag | u(1) |
| sps_six_minus_max_num_merge_cand | ue(v) |
| sps_sbt_enabled_flag | u(1) |
| sps_affine_enabled_flag | u(1) |
| if( sps_affine_enabled_flag ) { | |
|    sps_five_minus_max_num_subblock_merge_cand | ue(v) |
|    sps_affine_type_flag | u(1) |
|    if( sps_amvr_enabled_flag ) | |
|      sps_affine_amvr_enabled_flag | u(1) |
|    sps_affine_prof_enabled_flag | u(1) |
|    if( sps_affine_prof_enabled_flag ) | |
|      sps_prof_control_present_in_ph_flag | u(1) |
| } | |
| sps_bcw_enabled_flag | u(1) |
| sps_ciip_enabled_flag | u(1) |
| if( MaxNumMergeCand >= 2 ) { | |
|    sps_gpm_enabled_flag | u(1) |
|    if( sps_gpm_enabled_flag && MaxNumMergeCand >= 3 ) | |
|      sps_max_num_merge_cand_minus_max_num_gpm_cand | ue(v) |
| } | |
| sps_log2_parallel_merge_level_minus2 | ue(v) |
| } | |
| sps_isp_enabled_flag | u(1) |
| sps_mrl_enabled_flag | u(1) |
| sps_mip_enabled_flag | u(1) |
| if( ChromaArrayType != 0 ) | |
|    sps_cclm_enabled_flag | u(1) |
| if( sps_chroma_format_idc = = 1 ) { | |
|    sps_chroma_horizontal_collocated_flag | u(1) |
|    sps_chroma_vertical_collocated_flag | u(1) |
| } | |
| sps_mts_enabled_flag | u(1) |
| if( sps_mts_enabled_flag ) { | |
|    sps_explicit_mts_intra_enabled_flag | u(1) |
|    if (!sps_only_one_picture_present_flag) | |
|      sps_explicit_mts_inter_enabled_flag | u(1) |
| } | |
| sps_palette_enabled_flag | u(1) |
| if( ChromaArrayType = = 3 && !sps_max_luma_transform_size_64_flag ) | |
|    sps_act_enabled_flag | u(1) |
| if( sps_transform_skip_enabled_flag || sps_palette_enabled_flag ) | |
|    sps_internal_bit_depth_minus_input_bit_depth | ue(v) |
| sps_ibc_enabled_flag | u(1) |
| if( sps_ibc_enabled_flag ) | |
|    sps_six_minus_max_num_ibc_merge_cand | ue(v) |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|    sps_num_ladf_intervals_minus2 | u(2) |
|    sps_ladf_lowest_interval_qp_offset | se(v) |
|    for( i = 0; i < sps_num_ladf_intervals_minus2 + 1; i++ ) { | |
|      sps_ladf_qp_offset[ i ] | se(v) |
|      sps_ladf_delta_threshold_minus1[ i ] | ue(v) |
|    } | |
| } | |
| sps_explicit_scaling_list_enabled_flag | u(1) |
| if( sps_lfnst_enabled_flag && sps_explicit_scaling_list_enabled_flag ) | |
|    sps_scaling_matrix_for_lfnst_disabled_flag | u(1) |
| if( sps_act_enabled_flag && sps_explicit_scaling_list_enabled_flag ) | |
|    sps_scaling_matrix_for_alternative_colour_space_disabled_flag | u(1) |
| if( sps_scaling_matrix_for_alternative_colour_space_disabled_flag ) | |
|    sps_scaling_matrix_designated_colour_space_flag | u(1) |
| sps_dep_quant_enabled_flag | u(1) |
| if( !sps_dep_quant_enabled_flag ) | |
|    sps_sign_data_hiding_enabled_flag | u(1) |
| sps_virtual_boundaries_enabled_flag | u(1) |
| if( sps_virtual_boundaries_enabled_flag ) { | |
|    sps_virtual_boundaries_present_flag | u(1) |
|    if( sps_virtual_boundaries_present_flag ) { | |

TABLE 8-continued

Example SPS syntax

| | Descriptor |
|---|---|
|     sps_num_ver_virtual_boundaries | u(2) |
|     for( i = 0; i < sps_num_ver_virtual_boundaries; i++ ) | |
|       sps_virtual_boundary_pos_x[ i ] | ue(v) |
|     sps_num_hor_virtual_boundaries | u(2) |
|     for( i = 0; i < sps_num_hor_virtual_boundaries; i++ ) | |
|       sps_virtual_boundary_pos_y[ i ] | ue(v) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_hrd_parameters( firstSubLayer, sps_max_sublayers_minus1 ) | |
|   } | |
| } | |
| sps_field_seq_flag | u(1) |
| sps_vui_parameters_present_flag | u(1) |
| if( sps_vui_parameters_present_flag ) | |
|   vui_parameters( ) /* Specified in ITU-T H.SEI \| ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

TABLE 9

Example PH syntax

| | Descriptor |
|---|---|
| picture_header_structure( ) { | |
|   ph_gdr_or_irap_pic_flag | u(1) |
|   if( ph_gdr_or_irap_pic_flag ) | |
|     ph_gdr_pic_flag | u(1) |
|   if (!sps_only_one_picture_present_flag) { | |
|     ph_inter_slice_allowed_flag | u(1) |
|     if( ph_inter_slice_allowed_flag ) | |
|       ph_intra_slice_allowed_flag | u(1) |
|     ph_non_ref_pic_flag | u(1) |
|   } | |
|   ph_pic_parameter_set_id | ue(v) |
|   if (!sps_only_one_picture_present_flag) { | |
|     ph_pic_order_cnt_lsb | u(v) |
|     if( ph_gdr_or_irap_pic_flag ) | |
|       ph_no_output_of_prior_pics_flag | u(1) |
|     if( ph_gdr_pic_flag ) | |
|       ph_recovery_poc_cnt | ue(v) |
|   } | |
|   for( i = 0; i < NumExtraPhBits; i++ ) | |
|     ph_extra_bit[ i ] | u(1) |
|   if( sps_poc_msb_cycle_flag ) { | |
|     ph_poc_msb_cycle_present_flag | u(1) |
|     if( ph_poc_msb_cycle_present_flag ) | |
|       ph_poc_msb_cycle_val | u(v) |
|   } | |
|   if( sps_alf_enabled_flag && pps_alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) { | |
|         ph_alf_cb_flag | u(1) |
|         ph_alf_cr_flag | u(1) |
|       } | |
|       if( ph_alf_cb_flag \| \| ph_alf_cr_flag ) | |

TABLE 9-continued

Example PH syntax

| | Descriptor |
|---|---|
|     ph_alf_aps_id_chroma | u(3) |
|    if( sps_ccalf_enabled_flag ) { | |
|     ph_cc_alf_cb_enabled_flag | u(1) |
|     if( ph_cc_alf_cb_enabled_flag ) | |
|      ph_cc_alf_cb_aps_id | u(3) |
|     ph_cc_alf_cr_enabled_flag | u(1) |
|     if( ph_cc_alf_cr_enabled_flag ) | |
|      ph_cc_alf_cr_aps_id | u(3) |
|    } | |
|  } | |
| } | |
| if( sps_lmcs_enabled_flag ) { | |
|  ph_lmcs_enabled_flag | u(1) |
|  if( ph_lmcs_enabled_flag ) { | |
|   ph_lmcs_aps_id | u(2) |
|   if( ChromaArrayType != 0 ) | |
|    ph_chroma_residual_scale_flag | u(1) |
|  } | |
| } | |
| if( sps_explicit_scaling_list_enabled_flag ) { | |
|  ph_explicit_scaling_list_enabled_flag | u(1) |
|  if( ph_explicit_scaling_list_enabled_flag ) | |
|   ph_scaling_list_aps_id | u(3) |
| } | |
| if( sps_virtual_boundaries_enabled_flag && !sps_virtual_boundaries_present_flag ) { | |
|  ph_virtual_boundaries_present_flag | u(1) |
|  if( ph_virtual_boundaries_present_flag ) { | |
|   ph_num_ver_virtual_boundaries | u(2) |
|   for( i = 0; i < ph_num_ver_virtual_boundaries; i++ ) | |
|    ph_virtual_boundary_pos_x[ i ] | ue(v) |
|   ph_num_hor_virtual_boundaries | u(2) |
|   for( i = 0; i < ph_num_hor_virtual_boundaries; i++ ) | |
|    ph_virtual_boundary_pos_y[ i ] | ue(v) |
|  } | |
| } | |
| if( pps_output_flag_present_flag && !ph_non_ref_pic_flag &&!sps_only_one_picture_present_flag ) | |
|  ph_pic_output_flag | u(1) |
| if( pps_rpl_info_in_ph_flag &&!sps_only_one_picture_present_flag ) | |
|  ref_pic_lists( ) | |
| if( sps_partition_constraints_override_enabled_flag ) | |
|  ph_partition_constraints_override_flag | u(1) |
| if( ph_intra_slice_allowed_flag ) { | |
|  if( ph_partition_constraints_override_flag ) { | |
|   ph_log2_diff_min_qt_min_cb_intra_slice_luma | ue(v) |
|   ph_max_mtt_hierarchy_depth_intra_slice_luma | ue(v) |
|   if( ph_max_mtt_hierarchy_depth_intra_slice_luma != 0 ) { | |
|    ph_log2_diff_max_bt_min_qt_intra_slice_luma | ue(v) |
|    ph_log2_diff_max_tt_min_qt_intra_slice_luma | ue(v) |
|   } | |
|   if( sps_qtbtt_dual_tree_intra_flag ) { | |
|    ph_log2_diff_min_qt_min_cb_intra_slice_chroma | ue(v) |
|    ph_max_mtt_hierarchy_depth_intra_slice_chroma | ue(v) |
|    if( ph_max_mtt_hierarchy_depth_intra_slice_chroma != 0 ) { | |
|     ph_log2_diff_max_bt_min_qt_intra_slice_chroma | ue(v) |
|     ph_log2_diff_max_tt_min_qt_intra_slice_chroma | ue(v) |
|    } | |
|   } | |
|  } | |
|  if( pps_cu_qp_delta_enabled_flag ) | |
|   ph_cu_qp_delta_subdiv_intra_slice | ue(v) |
|  if( pps_cu_chroma_qp_offset_list_enabled_flag ) | |
|   ph_cu_chroma_qp_offset_subdiv_intra_slice | ue(v) |
| } | |
| if( ph_inter_slice_allowed_flag ) { | |
|  if( ph_partition_constraints_override_flag ) { | |
|   ph_log2_diff_min_qt_min_cb_inter_slice | ue(v) |
|   ph_max_mtt_hierarchy_depth_inter_slice | ue(v) |
|   if( ph_max_mtt_hierarchy_depth_inter_slice != 0 ) { | |
|    ph_log2_diff_max_bt_min_qt_inter_slice | ue(v) |
|    ph_log2_diff_max_tt_min_qt_inter_slice | ue(v) |
|   } | |
|  } | |
|  if( pps_cu_qp_delta_enabled_flag ) | |
|   ph_cu_qp_delta_subdiv_inter_slice | ue(v) |
|  if( pps_cu_chroma_qp_offset_list_enabled_flag ) | |

TABLE 9-continued

Example PH syntax

| | Descriptor |
|---|---|
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && pps_rpl_info_in_ph_flag ) { | |
|       if( num_ref_entries[ 1 ][ RplsIdx[ 1 ] ] > 0 ) | |
|         ph_collocated_from_l0_flag | u(1) |
|       if( ( ph_collocated_from_l0_flag && | |
|         num_ref_entries[ 0 ][ RplsIdx[ 0 ] ] > 1 ) \|\| | |
|         ( !ph_collocated_from_l0_flag && | |
|         num_ref_entries[ 1 ][ RplsIdx[ 1 ] ] > 1 ) ) | |
|         ph_collocated_ref_idx | ue(v) |
|     } | |
|   } | |
|   if( sps_mmvd_fullpel_only_flag ) | |
|     ph_mmvd_fullpel_only_flag | u(1) |
|   if( !pps_rpl_info_in_ph_flag \|\| num_ref_entries[ 1 ][ RplsIdx[ 1 ] ] > 0 ) { | |
|     ph_mvd_l1_zero_flag | u(1) |
|   if( sps_bdof_control_present_in_ph_flag ) | |
|     ph_bdof_disabled_flag | u(1) |
|   if( sps_dmvr_control_present_in_ph_flag ) | |
|     ph_dmvr_disabled_flag | u(1) |
|   } | |
|   if( sps_prof_control_present_in_ph_flag ) | |
|     ph_prof_disabled_flag | u(1) |
|   if( ( pps_weighted_pred_flag \|\| pps_weighted_bipred_flag ) && | |
|     pps_wp_info_in_ph_flag ) | |
|     pred_weight_table( ) | |
| } | |
| if( pps_qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && pps_sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( pps_deblocking_filter_override_enabled_flag && pps_dbf_info_in_ph_flag ) { | |
|   ph_deblocking_filter_override_flag | u(1) |
|   if( ph_deblocking_filter_override_flag ) { | |
|     if( !pps_deblocking_filter_disabled_flag ) | |
|       ph_deblocking_filter_disabled_flag | u(1) |
|     if( !ph_deblocking_filter_disabled_flag ) { | |
|       ph_luma_beta_offset_div2 | se(v) |
|       ph_luma_tc_offset_div2 | se(v) |
|       if( pps_chroma_tool_offsets_present_flag ) { | |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } | |
|     } | |
|   } | |
| } | |
| if( pps_picture_header_extension_present_flag ) { | |
|   ph_extension_length | ue(v) |
|   for( i = 0; i < ph_extension_length; i++) | |
|     ph_extension_data_byte[ i ] | u(8) |
| } | |
| } | |

What is claimed is:

1. A method performed by at least one processor, the method comprising:
receiving a bitstream including a sequence parameter set (SPS), the SPS including a flag that specifies whether the bitstream includes only one coded picture;
inferring a value of at least one syntax element of the SPS, based on the flag specifying that the bitstream includes only the one coded picture; and
decoding the one coded picture based on the inferring, wherein the flag having a first value specifies that the bitstream includes a plurality of coded pictures, and the flag having a second value specifies that the bitstream includes only the one coded picture.

2. The method of claim 1, wherein the at least one syntax element of the SPS, that is inferred based on the flag specifying that the bitstream includes only the one coded picture, includes a syntax element that specifies an ID of a video parameter set.

3. The method of claim 1, wherein the at least one syntax element of the SPS, that is inferred based on the flag specifying that the bitstream includes only the one coded picture, includes a syntax element that specifies a maximum number of temporal sublayers that are allowed to be present in each coded layer video sequence (CLVS) referring to the SPS.

4. The method of claim 1, wherein the at least one syntax element of the SPS, that is inferred based on the flag specifying that the bitstream includes only the one coded picture, includes a flag that specifies whether a profile, tier, level syntax structure is present in the SPS.

5. The method of claim 1, wherein the at least one syntax element of the SPS, that is inferred based on the flag specifying that the bitstream includes only the one coded picture, includes a syntax element related to picture order count (POC).

6. The method of claim 1, wherein the at least one syntax element of the SPS, that is inferred based on the flag specifying that the bitstream includes only the one coded picture, includes a syntax element related to inter slice.

7. The method of claim 1, wherein the at least one syntax element of the SPS, that is inferred based on the flag specifying that the bitstream includes only the one coded picture, includes a syntax element related to an inter coding tool.

8. The method of claim 1, further comprising:
inferring a value of at least one syntax element of a picture header of the one coded picture, based on the flag specifying that the bitstream includes only the one coded picture,
wherein the decoding comprises decoding the one coded picture based on the inferring of the value of the at least one syntax element of the SPS and the value of the at least one syntax element of the SPS.

9. The method of claim 8, wherein the at least one syntax element of the picture header, that is inferred based on the flag specifying that the bitstream includes only the one coded picture, includes a flag that specifies whether a slice type is allowed for the one coded picture.

10. The method of claim 8, wherein the at least one syntax element of the picture header, that is inferred based on the flag specifying that the bitstream includes only the one coded picture, includes a flag that specifies whether the one coded picture is a reference picture.

11. The method of claim 8, wherein the at least one syntax element of the picture header, that is inferred based on the flag specifying that the bitstream includes only the one coded picture, includes a syntax element related to a picture order count (POC) or a decoded picture buffer (DPB).

12. A system comprising:
at least one memory storing computer code; and
at least one processor configured to receive a bitstream including a sequence parameter set (SPS), the SPS including a flag that specifies whether the bitstream includes only one coded picture, the at least one processor further configured to access the computer code and operate as instructed by the computer code, the computer code including:
inferring code configured to cause the at least one processor to infer a value of at least one syntax element of the SPS, based on the flag specifying that the bitstream includes only the one coded picture; and
decoding code configured to cause the at least one processor to decode the one coded picture based on inferring the value of the at least one syntax element of the SPS,
wherein the flag having a first value specifies that the bitstream includes a plurality of coded pictures, and the flag having a second value specifies that the bitstream includes only the one coded picture.

13. The system of claim 12, wherein the at least one syntax element of the SPS, that is inferred based on the flag specifying that the bitstream includes only the one coded picture, includes a syntax element that specifies an ID of a video parameter set.

14. The system of claim 12, wherein the at least one syntax element of the SPS, that is inferred based on the flag specifying that the bitstream includes only the one coded picture, includes a syntax element that specifies a maximum number of temporal sublayers that are allowed to be present in each coded layer video sequence (CLVS) referring to the SPS.

15. The system of claim 12, wherein the at least one syntax element of the SPS, that is inferred based on the flag specifying that the bitstream includes only the one coded picture, includes a flag that specifies whether a profile, tier, level syntax structure is present in the SPS.

16. The system of claim 12, wherein the at least one syntax element of the SPS, that is inferred based on the flag specifying that the bitstream includes only the one coded picture, includes a syntax element related to picture order count (POC).

17. The system of claim 12, wherein the at least one syntax element of the SPS, that is inferred based on the flag specifying that the bitstream includes only the one coded picture, includes a syntax element related to inter slice.

18. The system of claim 12, wherein the at least one syntax element of the SPS, that is inferred based on the flag specifying that the bitstream includes only the one coded picture, includes a syntax element related to an inter coding tool.

19. The system of claim 12, wherein
the inferring code is further configured the cause the at least one processor to infer a value of at least one syntax element of a picture header of the one coded picture, based on the flag specifying that the bitstream includes only the one coded picture, and
the decoding code is configured the cause the at least one processor to decode the one coded picture based on inferring the value of the at least one syntax element of the SPS and the value of the at least one syntax element of the SPS.

20. A non-transitory computer-readable medium storing computer code that is configured to, when executed by at least one processor, cause the at least one processor to:
infer a value of at least one syntax element of an SPS of a received bitstream, based on a flag of the SPS specifying that the received bitstream includes only one coded picture; and
decode the one coded picture based on inferring the value of the at least one syntax element of the SPS,
wherein the flag having a first value specifies that the bitstream includes a plurality of coded pictures, and the flag having a second value specifies that the bitstream includes only the one coded picture.

* * * * *